US008346519B2

(12) United States Patent
Yin et al.

(10) Patent No.: US 8,346,519 B2
(45) Date of Patent: Jan. 1, 2013

(54) CHEMICAL PROCESSING SYSTEM

(76) Inventors: Qiying Yin, Salford (GB); Nan Zhang, Cheshire (GB)

( * ) Notice: Subject to any disclaimer, the term of this patent is extended or adjusted under 35 U.S.C. 154(b) by 581 days.

(21) Appl. No.: 12/530,328

(22) PCT Filed: Feb. 26, 2008

(86) PCT No.: PCT/GB2008/000635
§ 371 (c)(1),
(2), (4) Date: Sep. 8, 2009

(87) PCT Pub. No.: WO2008/110742
PCT Pub. Date: Sep. 18, 2008

(65) Prior Publication Data
US 2010/0088075 A1    Apr. 8, 2010

(30) Foreign Application Priority Data

Mar. 9, 2007  (GB) .................................. 0704616.2

(51) Int. Cl.
*G06G 7/48* (2006.01)
(52) U.S. Cl. .................. 703/6; 703/2; 702/184
(58) Field of Classification Search .............. 703/1, 2, 703/6; 700/99, 286; 705/7, 7.25; 702/184; 701/2, 3
See application file for complete search history.

(56) References Cited

U.S. PATENT DOCUMENTS

| 5,798,939 | A  | * | 8/1998 | Ochoa et al. | 700/286 |
| 6,151,582 | A  | * | 11/2000 | Huang et al. | 705/7.25 |
| 7,318,008 | B2 | * | 1/2008 | Hagen | 702/184 |
| 2003/0074244 | A1 | * | 4/2003 | Braxton | 705/7 |
| 2004/0236547 | A1 | * | 11/2004 | Rappaport et al. | 703/2 |
| 2006/0004548 | A1 | * | 1/2006 | Santos et al. | 703/1 |
| 2006/0074558 | A1 | * | 4/2006 | Williamson et al. | 701/213 |
| 2007/0050070 | A1 | * | 3/2007 | Strain et al. | 700/99 |
| 2007/0124009 | A1 | * | 5/2007 | Bradley et al. | 700/99 |

OTHER PUBLICATIONS

Wikipedia, "Reliability Engineering", common definition.*
Castillo et al., "Derivation and calibration of transient error reliability model", IEEE 1982.*
Brennan et al., "Stochastic optimization applied to a manufacturing system operation problem", IEEE 1995.*
Goel, Harish et al. Optimal Reliability Design of Process Systems at the Conceptual Stage of Design. 2003 Proceedings of the Annual Reliability and Maintainability Symposium. 2003 IEEE.
Yin, Qiying (Scarlett), "Integrating Reliability, Availabity and Maintainability into Process Synthesis," The University of Manchester, Centre for Process Integration (2005).

* cited by examiner

*Primary Examiner* — Kandasamy Thangavelu

(57) ABSTRACT

A method of optimising a processing system comprising a plurality of apparatuses includes defining a system model indicative of a predetermined range of apparatus options within a processing system, constraints indicative of feasible interconnections between each apparatus and another apparatus, and parameters indicative of performance criteria associated with each apparatus. The system model is analysed with respect to predetermined criteria to determine a preferred arrangement of apparatuses within the processing system.

A parameter relating to at least one apparatus is indicative of the availability and/or the reliability of the apparatus expressed as a function of time.

22 Claims, 10 Drawing Sheets

CHEMICAL PROCESSING SYSTEM

CROSS-REFERENCE TO RELATED APPLICATIONS

This application is a national phase entry of prior PCT Application No. PCT/GB2008/000635 filed 26 Feb. 2008 and entitled "Chemical Processing System", hereby incorporated herein by reference, which claims the benefit of GB Patent Application No. 0704616.2 filed 9 Mar. 2007 and entitled "Chemical Processing System", hereby incorporated herein by reference.

STATEMENT REGARDING FEDERALLY SPONSORED RESEARCH OR DEVELOPMENT

Not applicable.

The present invention relates to methods of design, manufacture, and operation of processing systems such as chemical plants. The present invention is particularly suitable for improving a technique known as process synthesis.

Chemical processing systems vary from relatively simply configurations of apparatuses such as heat exchangers, to complex industrial plants including a large number of interconnected apparatuses arranged to produce relatively complex chemical or biological products. At the conceptual design stage, decisions made on process selection and system configuration typically fix a major portion of the total lifecycle cost of such systems. Major economic benefits can therefore be gained by optimum selection of the apparatuses or equipment, and the arrangement (e.g. interconnectivity) of the apparatuses, used in such processing systems.

During the build or manufacture of a new process, there are typically five stages: feasibility study, concept design, detail design, construction and start-up.

The feasibility study examines whether it is actually feasible to design a particular new process, and examines both the technological and financial feasibility of designing a new process. The study typically determines an initial process model or flow sheet, indicating types of process options required to achieve the desired process.

In the concept design stage, a range of feasible process options are listed based on the initial process model or flow sheet, and analysed using an approach called process synthesis.

Process synthesis is implemented by creating a superstructure which includes a range of feasible process options (e.g. alternative apparatus/equipment options, ranges of operating conditions associated with the equipment) together with a range of feasible interconnections between the different apparatuses (e.g. whether apparatuses can be placed in series, parallel or both). Typically, the superstructure will include equality constraints corresponding to the relevant process model e.g. covering mass and energy balances through the flow sheet, equilibrium relationships of operations and reactions within the flow sheet etc. The superstructure is then optimised to find the optimal process flow sheet (optimal types of apparatus and sizes) and process parameters (e.g. temperature, flow rates, etc.).

The optimal flow sheet and process parameters are determined based upon a predetermined objective. This predetermined objective is normally to maximise the economic performance of the process system e.g. to provide the optimal design which balances the trade-off between capital investment in manufacturing the system and operational cost of the system i.e. to minimise cost or maximise profit. Consequently, the proposed frame work or superstructure utilised in process synthesis typically includes an expected profit objective function, where revenues, investment cost, raw-material costs and corrective maintenance costs are made an explicit function of the system and the system components (apparatuses).

Once the superstructure has been declaratively specified using the relevant variables, possible values of variables, and constraints restricting allowed combinations of the values, a constraint solver can be utilised to determine an assignment of values to the variables satisfying the constraints ("constraint satisfaction"), in accordance with the predetermined objective (e.g. minimising cost). For example, a known method of determining an optimum process flow sheet is to provide the superstructure posed as a Mixed Integer, Non-Linear Programming (MINLP) optimisation problem, which is then solved using any one of a number of different available software packages, such as General Algebraic Modeling System (GAMS) made by GAMS Development Corporation in Washington, USA.

Once the optimal process flow sheet and process parameters have been determined, a detailed design stage is then initiated, followed by construction of the relevant chemical processing system e.g. the industrial manufacturing plant.

Traditionally, once the process system components and connectivity have been determined, Reliability, Availability and Maintainability (RAM) analysis is performed, so as to determine the likely availability of the plant and a desired maintenance schedule.

It has been realised that the availability of a plant can pay a significant role in the economic performance of a chemical production plant, and should ideally be considered during the design stage.

The article by H. Goel et al, "Optimal Reliability Design of Process Systems at the Conceptual Stage of Design", 2003 PROCEEDINGS Annual RELIABILITY AND MAINTAINABILITY Symposium describes an approach which includes the initial reliability of the process units and the process structure as a degree of freedom at the conceptual stage of design. The article describes the creation of a superstructure. The reliability block diagram assumes a constant failure rate for each unit or apparatus. The maintenance period is a fixed fraction of annual calendar time. Each unit is assigned an availability variable, with the availability being capable of taking a value between a minimum and a maximum achievable availability. The cost of each unit (piece of equipment) is defined as a function of the achieved availability. The process flow sheet and reliability block diagram are then solved simultaneously using MINLP to maximise the annualised expected profit, with a view to determining optimal values for equipment availability and the total system availability.

It is an aim of the embodiments of the present invention to address one or more problems of prior art, whether referred to herein or otherwise. It is an aim of a particular embodiments to provide an improved method of process synthesis, so as to allow the manufacture of chemical processing systems (e.g. industrial, chemical or biological plants) that have improved performance.

In a first aspect, the present invention provides a method of optimising apparatuses utilised within a processing system, comprising: defining a system model indicative of a predetermined range of apparatus options within a processing system, constraints indicative of feasible interconnections between each apparatus and other apparatuses, and parameters indicative of performance criteria associated with each apparatus; analysing the system model with respect to predetermined criteria to determine a preferred arrangement of apparatuses within the processing system, wherein at least one parameter relating to at least one of said apparatuses is indicative of at least one of the availability and reliability of the related apparatuses expressed as a function of time.

Such a method can greatly increase the resulting performance of the determined arrangement of apparatuses. The availability and reliability of an apparatus are interrelated concepts. By expressing at least one of the availability and reliability of a piece of apparatus as a function of time within the superstructure (model) used within the method, variation of these parameters over time (e.g. as the equipment wears out) can be included within the design process, and can lead to an arrangement of apparatuses having significantly improved performance.

Said step of analysing the structure with respect to predetermined criteria comprising minimising or maximising the value of a predetermined function.

Parameters indicative of both the availability and reliability may be expressed as a function of time.

Said at least one parameter indicative of at least one of availability and reliability may be expressed as a function of preventive maintenance.

Said parameter indicative of the availability of the apparatus may be expressed as a function of the time taken to perform preventive maintenance.

Said step of analysing the system model with respect to predetermined criteria to determine a preferred arrangement of apparatuses within the processing system may comprise determining a preferred value of preventive maintenance interval for at least some of the apparatuses in the preferred arrangement.

The method may further comprise: (a) assuming an initial value for a variable indicative of the interval of preventive maintenance of said at least one apparatus; (b) determining values of parameters indicative of at least one of the availability and reliability of apparatuses based upon the initial value of the interval of preventive maintenance; (c) performing the step of analysing the system model with respect to predetermined criteria, and determining a preferred value for the maintenance interval from that step; (d) if the determined preferred value for the maintenance interval is outside a predetermined range from the initial value of the maintenance interval, repeating steps (b) to (d) using a new initial value for the preventive maintenance interval, until the determined preferred value is within a predetermined range of the initial value.

Said predetermined criteria may include minimisation of the capital investment in manufacturing the arrangement of apparatuses within the processing system and the operation cost of the apparatuses within the processing system throughout the anticipated life of the preferred arrangement of apparatuses.

The method may further comprise analysing the performance criteria of real apparatuses to determine said parameters indicative of performance criteria.

The parameter indicative of the reliability of an apparatus may be expressed as a function of a time-dependent distribution.

The reliability $R_{sys}(t)$ of an arrangement of apparatuses may be expressed by the function $$R_{sys}(t) = \exp\left[-\left(\frac{t}{\theta}\right)^\beta\right], \theta > 0, \beta > 0, t \geq 0$$

where t is time, and $\theta$ and $\beta$ are Weibull distribution parameters.

The parameter indicative of the reliability of an arrangement of apparatuses may comprise at least two apparatuses is expressed as a function of a time-dependent distribution.

The availability $A_{a,sys}$ of an arrangement of apparatuses may be determined by $$A_{a,sys} = \frac{t_d}{t_d + MTTR_{sys} \cdot (-\ln(R_{sys}(t_d))) + MTPM_{sys} \cdot t_d / T_{PM,sys}}$$

where $MTTR_{sys}$ is the Mean Time To Repair the arrangement, $MTPM_{sys}$ is the Mean Time To Perform Preventive Maintenance of the arrangement, $R_{sys}$ is the arrangement reliability, $t_d$ is the arrangement life cycle and $T_{PM,sys}$ is the preventive maintenance interval of the arrangement.

The availability $A_{a,sys}$ of an arrangement of apparatuses may be determined by $$A_{a,sys} = \frac{t_d}{t_d + MTTR_{sys} \cdot t_d / \theta \Gamma\left(1 + \frac{1}{\beta}\right) + MTPM_{sys} \cdot t_d / T_{PM,sys}}$$

where $MTTR_{sys}$ is the Mean Time To Repair the arrangement, $\theta$ and $\beta$ are Weibull parameters for the arrangement and $MTPM_{sys}$ is the Mean Time To Perform Preventive Maintenance of the arrangement, $t_d$ is the arrangement life cycle and $T_{PM,sys}$ is the preventive maintenance interval of the arrangement.

The parameter $T_{PM,sys}$ may be a variable optimised within the analysing step.

The availability of an arrangement of apparatuses may comprise at least two apparatuses able to operate in i operational modes within the processing system is defined as the Process System Availability PSA, $$PSA = \frac{\text{Real Throughput}}{\text{Ideal Throughput}} = \sum_i A_i x_i$$

where
$A_i$=Availability of the arrangement of apparatuses in operation mode i
$x_i$=Ratio of actual to maximum capacity of arrangement in mode i.

At least one of the availability and reliability functions may be linearised functions.

Said system model may one of a superstructure and a stochastic optimization model.

The method may further comprise the step of manufacturing the determined preferred arrangement of apparatuses.

The method may further comprise the step of performing preventive maintenance upon the manufactured arrangement of apparatuses in accordance with the determined preferred value of preventive maintenance.

In a second aspect, the present invention provides a carrier medium carrying computable readable code configured to cause a computer to carry out the method as described above.

In a third aspect, the present invention provides a design for a processing system comprising a plurality of apparatuses, the design being determined by performing the method as described above.

In a fourth aspect, the present invention provides a processing system including the preferred arrangement of apparatuses as determined using the method as described above.

The processing system may be a chemical plant.

Embodiments of the present invention will now be described by way of example only, with reference to the accompanying figures, in which.

Figure 1:
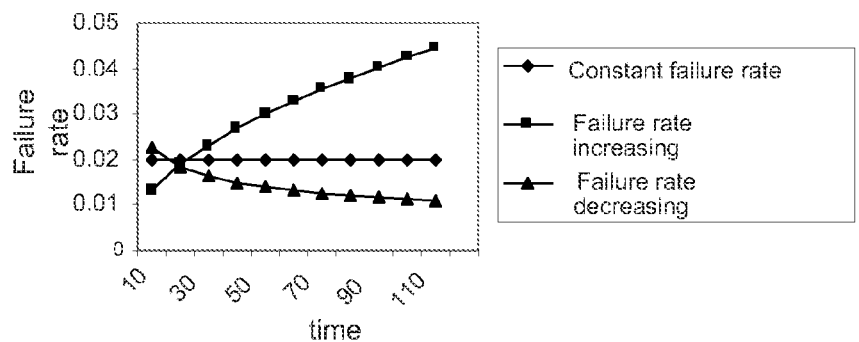
FIG. 1 is a graph of failure rate as a function of time, indicating how equipment failure rate can be constant, increase or decrease with respect to time.

The present inventors have appreciated that including the reliability or availability of equipment as a function of time at the design stage can have a major impact on the design of the system, and ultimately upon the economic performance of the system. The article by H. Goel et al incorporates the concept of availability into the design process, but assumes that equipment availability is fixed over operation time i.e. a constant failure rate for each unit, and thus ignores the effects of maintenance optimization. The present inventors have realised that that assumption is unrealistic, and systems having significantly increased performance can be realised by taking account of the variation in availability and/or reliability with time.

For example, the reliability of a piece of equipment (i.e. an apparatus) can initially increase as the equipment "burns in", then may be constant for a period of time, with the reliability decreasing as the equipment wears out. Reliability and availability are interrelated concepts. Thus a change in reliability as a function of time will directly influence the availability of that piece of equipment. Further, maintenance has a direct impact on both the reliability and availability of equipment.

Expressing at least one of reliability or availability as a function of time allows the optimisation of the processing system to take into account temporal variations in reliability and availability, generally leading to the design (and ultimately, manufacture) of systems having improved performance. Further, the influence of preventive maintenance on reliability and availability can be utilised to determine the optimum preventive maintenance schedule for use in a processing system at the design stage.

In order to place the invention into context, the concepts associated with reliability, availability and maintainability utilised within embodiments of the invention will now be described in more detail, and subsequently two examples of the application of embodiments of the invention ("Case Study 1" and "Case Study 2") will be described.

The reliability, availability and maintainability of a production plant is closely related to the profit of the production plant. It has been estimated that the loss in profit of chemical plants due to unavailability can range from $500 to $100,000 per hour. In many instances, maintenance spending is the second largest portion of the operational budget of industrial plants, (typically energy costs are the largest portion). Maintenance and operations departments can form a significant portion of the total manpower of an industrial plant. In oil refineries, it is not uncommon that the maintenance and operations departments are the largest department, and that each comprises about 30% of total manpower.

The present inventors have realised that it is desirable that reliability, availability and maintainability are considered during the design process. The typical prior art technique of performing RAM analysis after the flow sheet is fixed (i.e. after the configuration or arrangement of apparatuses within the processing system is fixed) is undesirable. If RAM analysis is performed after the flow sheet is fixed, then it can be difficult/very expensive to alter the design (configuration/arrangement of apparatuses) to accommodate the results of RAM studies, especially when structural changes to existing processing systems are required.

Reliability is the probability that a component (apparatus) or system will perform a required function for a given period of time when used under stated operating conditions. Reliability can therefore be expressed as the probability that an apparatus will not fail over time.

Reliability can be improved by reducing the frequency of failure of the apparatus over a time interval. Reliability is a measure of the probability for failure-free-operation during a given time interval i.e. it is a measure of success for failure free operation, and can be expressed as:

$$R(t) = \exp\left[-\int_0^t \lambda(t)dt\right] \qquad (1)$$

where R(t) is the reliability at time t, and λ(t) is the failure rate at time t, for the particular apparatus. When t=0, R(t)=1; when t→∞, R(t)=0; R(t)≧0.

Equipment reliability can be expressed using a number of parameters. For example, two typical reliability indications are the Mean Time To Failure (MTTF) and the Mean Time Between Maintenance (MTBM). Generally, the longer the MTTF, the better, as it indicates that the equipment has high reliability. However, the values of MTTF and/or MTBM alone are not sufficient to characterise the reliability of an apparatus or a system including a number of apparatuses, as these values do not indicate the failure distribution of the apparatus (or system) with respect to time.

As shown in FIG. 1, the failure rate of a piece of equipment can vary as a function of time i.e. over the expected life time or life cycle of the apparatus (with arbitrary units of time being indicated). FIG. 1 indicates three separate scenarios: apparatus in which the failure rate is constant, apparatus in which the failure rate is increasing, and apparatus in which the failure rate is decreasing. Often, a single apparatus will go through all three stages (decreasing, constant and increasing failure rates) during its life cycle, with failure rate being influenced by a number of parameters including preventive maintenance.

Decreasing failure rate can occur when apparatus is in a burn-in stage. It can be caused by manufacturing defects, welding flaws, cracks, defective parts, poor quality control, contamination, poor workmanship etc. The failure rate can be reduced by burn-in testing, screening, quality control and acceptance testing.

Apparatus typically has a constant failure rate during the useful life of the apparatus. Likely causes for failure of the apparatus during the constant failure rate stage are random (high or low) loads applied to the apparatus due to the operating environment of the apparatus, human error and chance events. Constant failure rate can be reduced by redundancy within the apparatus (or the system including the apparatus) and over-engineering the apparatus.

Increasing failure rate is typical of much apparatus, and occurs when the apparatus is wearing out. Increasing failure rate is caused by fatigue, corrosion, ageing, friction and cyclical loading of the apparatus. Increasing failure rate can be reduced by derating (i.e. using the apparatus at a lower rated task than the apparatus is designed for), preventive maintenance, predictive maintenance e.g. parts replacement, and improvements in technology.

Within the process industry, the majority of equipment is in the portion of their life cycle that has an increasing failure rate. Appropriate utilisation of preventive maintenance, and incorporating the concept within the initial design stage (e.g. within process synthesis) of the processing system/apparatus, is therefore desirable so as to improve equipment reliability and optimise the equipment failure rate.

Equation (1) indicates how reliability can be expressed as an exponential function. However, it should be appreciated that reliability can be expressed utilising other functions e.g. normal distribution and lognormal distributions to indicate the variation in reliability of equipment as a function of time.

It should be noted that the failure rate is a function of time, which is in contrast to prior art process synthesis techniques which express the failure rate as being constant. For example, if the failure rate is assumed to be constant i.e. $\lambda(t)=\lambda$, $t \geq 0$, $\lambda > 0$, then equation (1) reduces to:

$$R(t) = \exp[-\lambda t], t \geq 0 \quad (2)$$

and $$MTTF = 1/\lambda \quad (3)$$

The technique described herein assumes that the failure rate is not a constant, but instead expresses how failure rate varies over time i.e. it is a function of time. Analysis of real equipment can be utilised to determine how the failure rate of such equipment varies as a function of time. Such functions can then be implemented in optimisation techniques as described herein i.e. the process synthesis can be based upon parameters indicative of actual reliability determined from real equipment.

Alternatively, as utilised within the examples described herein, the reliability function can be expressed as a Weibull Distribution, which can apply in both increasing and decreasing failure rates. The reliability function, expressed as a Weibull Distribution reliability function, then becomes:

$$R(t) = \exp\left[-\left(\frac{t}{\theta}\right)^\beta\right], \quad (4)$$

$$\theta > 0, \beta > 0, t \geq 0$$

in which case $$MTTF = \theta \Gamma\left(1 + \frac{1}{\beta}\right) \quad (5)$$

Where $\Gamma(x)$ is the gamma function:

$$\Gamma(x) = \int_0^\infty y^{x-1} e^{-y} dy \quad (6)$$

and β is the shape parameter associated with the Weibull Distribution. When 0<β<1, the failure rate is decreasing; when β=1, the failure rate is constant; and when β>1, the failure rate is increasing. The parameter θ is the Weibull Distribution scale parameter that influences both the mean and spread, or dispersion, of the distribution. As θ increases, the reliability increases at a given point in time.

As equipment reliability in process industries is typically dominated by increasing failure rate, the Weibull Distribution has been determined as being a good function for simulating the actual equipment reliability.

Availability is the probability that a component or system (e.g. apparatus or arrangement of apparatuses) is performing its required function at a given point in time or over a stated period of time, when operated and maintained in a prescribed/predetermined manner.

Availability A can be defined by the general function:

$$A = \frac{Uptime}{Uptime + Downtime} \quad (7)$$

Uptime indicates the period of time for which the apparatus is operational, whilst downtime relates to the period of time for which the apparatus is not operational. As discussed within the book by Ebeling, Charles E., "An introduction to reliability and maintainability engineering", McGraw-Hill, ©1997, there are several different forms of availability depending upon the precise definition of uptime and downtime.

The inherent availability $A_{inh}$ is defined as:

$$A_{inh} = \frac{MTBF}{MTBF + MTTR} \quad (8)$$

where MTBF is the Mean Time Between Failures of the apparatus and MTTR is the Mean Time To Repair the apparatus. The inherent availability is based solely on the failure distribution and repair-time distribution. It can be viewed as an equipment design parameter.

The achieved availability $A_a$ can be defined as:

$$A_a = \frac{MTBM}{MTBM + \overline{M}} \quad (9)$$

where MTBM is the Mean Time Between Maintenance, and $\overline{M}$ is the Mean system downtime, which includes scheduled downtime (e.g. for preventive maintenance) as well as unscheduled downtime.

In previous techniques, the methodologies used only the inherent availability of apparatuses, and preventive maintenance was not taken into consideration. The inherent availability of an apparatus is likely to be a constant during the lifetime of the apparatus, as it only presents the instantaneous value of availability when the apparatus/system is newly installed. Consequently, prior art approaches did not consider the variation of availability with time i.e. the variation in availability of the apparatus/system through the life cycle of the apparatus/system.

Achieved availability considers both unscheduled breakdown and scheduled breakdown, and is the availability of the apparatus as understood by the maintenance department. In a preferred embodiment, a model of the achieved availability of apparatus/system is used within design process (process synthesis), so as to reflect the variation in availability during the life cycle of the apparatus/system.

Maintainability is the probability that equipment (i.e. a unit or a system) will be restored to operational effectiveness within a given period of time when the maintenance action is performed in accordance with prescribed procedures.

Maintenance can be considered to be of two types: re-active and proactive maintenance.

Re-active maintenance, also known as corrective maintenance, is performed in response to unplanned or unscheduled downtime of the unit. Re-active maintenance is normally performed after a failure of the unit.

Proactive maintenance can be either preventive maintenance or predictive maintenance.

Preventive maintenance is scheduled downtime, usually periodical, in which a well-set of tasks are performed. Tasks could include inspection and repair, replacement, cleaning, lubrication, adjustment and/or alignment of the apparatus.

Predictive maintenance estimates, using diagnostic tools and measurements, when a part is approaching failure, and should be repaired or replaced. Predictive maintenance requires a very high understanding of equipment types. Predictive maintenance could be incorporated in embodiments of the present invention by using appropriate parameters or functions within the techniques described herein. However, in preferred embodiments predictive maintenance is not considered, only preventive maintenance, as predictive maintenance is not usually implemented within current systems within the process industry. Therefore, in the methods described herein, proactive maintenance is considered to only incorporate preventive maintenance.

Taking into account both corrective maintenance and preventive maintenance, the Mean Down Time $\overline{M}$ (i.e. the time for which the apparatus or system is unavailable due to maintenance) for a given time period (e.g. a year) can be defined as:

$$\overline{M} = \frac{\begin{array}{c}MTTR \times \text{No. Corrective Maintenance} \\ \text{in a given period} + MTPM \times \\ \text{No. Preventive Maintenance in a given period}\end{array}}{\text{Total No. of Maintenance in a given period}} \quad (10)$$

where MTPM is the Mean Time of Preventive Maintenance (i.e. the average time taken to perform the preventive maintenance), and MTTR is the Mean Time To Repair (i.e. the average time to repair the apparatus or system when corrective maintenance is required). The inherent repair time of an item can be defined as the sum of the time periods taken to perform the following tasks: access, diagnosis, repair or replacement, validation and alignment of the apparatus. External delay parameters in performing the repair process could be, but are not normally, taken into consideration. For example, such external parameters can include the supply delay (the total delay time in obtaining necessary spare parts or components in order to complete the repair process) and maintenance delay (the time duration prior to the repair being initiated i.e. the time spent waiting for maintenance resources or facilities).

From the above explanations of reliability, availability and maintainability, it will be appreciated that the availability of a processing system such as a chemical process production plant can be significantly affected by the reliability and maintainability of the system. The reliability, maintainability and maintenance of the system affect and depend upon each other. Any equipment in a system has an initial (design) reliability and maintainability which is designed and determined when the equipment is manufactured and stored within the system. Subsequently, the system will be subject to both corrective and preventive maintenance (CM and PM). Corrective Maintenance includes all actions necessary to return a system from a failed to an operating or available state. The degree of CM required is therefore determined by the equipment/system reliability. CM can not usually be planned, as repairs must generally be attended to as and when failures occur.

Preventive maintenance seeks to retain the system in an operational or available state by preventing failures from occurring. PM affects the reliability of the system directly. PM should be planned so as to be performed when it is optimum to do so. PM can be modelled within the superstructure/optimisation model by providing parameters indicative of the time taken to perform the specified maintenance tasks and the frequency of the maintenance tasks. There is thus a close relationship between reliability and maintainability, one affecting the other, and both reliability and maintainability affecting availability and operational costs of a processing system.

The present inventors have realised the importance of not only incorporating CM, but also PM into calculations to determine the optimum apparatus arrangement within a process system. For example, the optimum preventive maintenance can reduce the number of breakdowns of equipment, and save lost production cost, but alternatively too frequent preventive maintenance can also lead to lost production costs as the maintenance itself requires downtime. By appreciating these aspects, the inventors have realised that incorporation of the affects of preventive maintenance into process synthesis is desirable, so as to improve the performance of the final optimised system arrangement output from the process synthesis.

In the preferred embodiment, the optimisation methods can be viewed as being within two parts—a modelling part and a model-solving part. In the modelling part, a model (i.e. a superstructure) is formed, including both a reliability model and availability model applied to single equipment and the system, and an optimisation model is constructed including a predetermined range of apparatus (i.e. equipment) options within the processing system, constraints indicative of feasible interconnections between the apparatuses within the range of apparatus options, and parameters indicative of performance criteria associated with the apparatuses, as well as associated costs. In the model solving part, the superstructure is analysed using known techniques (e.g. MINLP) to determine an optimum solution i.e. a preferred arrangement of apparatuses according to predetermined criteria. Typically, the applied criteria is to minimise the annual cost of the processing system. The criteria is preferably applied to a model including parameters at both the single equipment level and the system level. The output is a preferred arrangement of apparatuses within the processing system e.g. a selection of the apparatuses from the predetermined range of apparatus options, the preferred interconnections between the selected apparatuses, as well as preferred performance criteria associated with each apparatus (e.g. reliability and availability of the apparatus, as well as a preventive maintenance schedule).

In order to facilitate the formation and optimisation of such a superstructure, further explanation will now be given on how the relationship between preventive maintenance, reliability and availability can be expressed.

Reliability Function and Preventive Maintenance

Within the process industry, processing or production systems are relatively complex, and equipment is typically characterised by a long period over which it gradually wears-out. In such circumstances, increased reliability and availability can be achieved by conducting appropriate preventive maintenance. To determine the optimum maintenance schedule, the relationship between reliability and preventive maintenance has to first be determined.

The following reliability model is based on the assumption that a system or apparatus is restored to its original condition following preventive maintenance. Defining R(t) as the system reliability without maintenance, $T_{PM}$ the integral of time between preventive maintenance sessions, and $R_n(t)$ the reliability of the system with preventive maintenance, then:

$$R_m(t) = R(t) \text{ for } 0 < t < T_{PM} \quad (11)$$

$$R_m(t) = R(t)R(t-T_{PM}) \text{ for } T_{PM} < t < 2T_{PM} \quad (12)$$

where R(t) is the probability of survival until the first preventive maintenance task and $R(t-T_{PM})$ is the probability of surviving the additional time $t-T_{PM}$ given that the system was restored to its original condition at time $T_{PM}$. By iteration, it will be appreciated that the general formulation is:

$$R_m(t) = R(T_{PM})^n R(t - nT_{PM}) \quad (13)$$

$$nT_{PM} \leq t < (n+1)T_{PM}$$

$$n = 0, 1, 2 \ldots$$

where $R(T_{PM})^n$ is the probability of surviving n maintenance intervals and $R(t-nT_{PM})$ is the probability of surviving $t-nT_{PM}$ time units past the last preventive maintenance.

Reformulating this expression for the Weibull failure distribution, using the Weibull parameters $\beta$ and $\theta$ leads to the expression:

$$R_m(t) = \exp\left[-n\left(\frac{T_{PM}}{\theta}\right)^\beta\right]\exp\left[-\left(\frac{t-nT_{PM}}{\theta}\right)^\beta\right] \quad (14)$$

$$nT_{PM} \leq t \leq (n+1)T_{PM}$$

and the Mean Time To Failure (MTTF) can be expressed as:

$$MTTF = \frac{\int_o^T R(t)dt}{1 - R(T)} \quad (15)$$

Substituting for R(t) in equation (15), then the MTTF through preventive maintenance can be expressed as:

$$MTTF = \frac{\int_o^T e^{-(t/\theta)^\beta} dt}{1 - R(T)} \quad (16)$$

For a Weibull reliability distribution, if $\theta_0$ is the scale parameter without preventive maintenance, and $\theta$ is the Weibull scale parameter with preventive maintenance, then $$MTTF = \frac{1/2 \cdot \text{erf}(T_{PM}/\theta_o) \cdot \sqrt{\pi \cdot \theta_o}}{1 - R(T_{PM})} \pi \quad (17)$$

$$\theta = \frac{MTTF}{\Gamma\left(1 + \frac{1}{\beta}\right)} \quad (18)$$

where erf(x) is the error function i.e. twice the integral of the Gaussian distribution with zero mean and variance ½, i.e.:

$$\text{erf}(x) = \frac{2}{\sqrt{\pi}} \int_0^x e^{\frac{-t2}{}} dt \quad (19)$$

and the gamma function is as defined within equation (6

Figure 2:
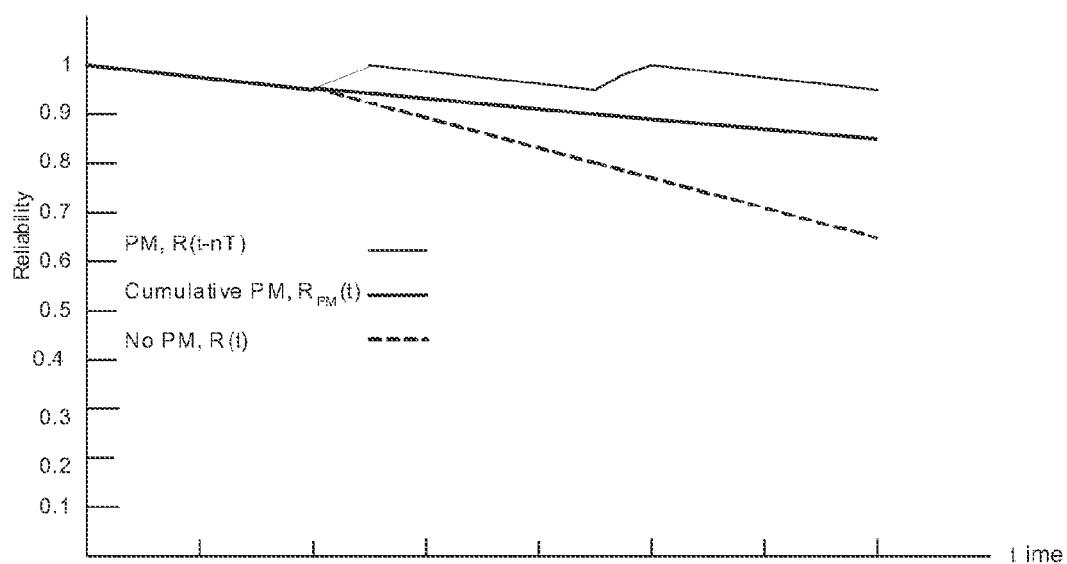
FIG. 2 is a graph of reliability against time for equipment having an increasing failure rate, indicating the influence of periodic maintenance.

FIG. 2 indicates the effect of preventive maintenance on the reliability of a component or system, as a function of time. The dotted line indicates the reliability as a function of time, assuming no preventive maintenance. The upper, thinner line shows the reliability for a component or system, assuming that preventive maintenance restores the component/system to "as good as new" (AGAN) at the end of each preventive maintenance cycle (i.e. $R(t-Nt_{PM})$), but does not take into account the cumulative reliability over time (i.e. $R(T_{PM})^n$).

The reliability function with preventive maintenance $R_m(t)$ is a monotonically decreasing function. On the other hand, the conditional reliability $R_m(t|nT)$ equals $R(t-nT)$ for $nT \leq t < (n+1)T$.

From the above information, including FIG. 2, it will be appreciated that preventive maintenance acts to increase reliability at a given time point, and thus extends the Mean Time To Failure (MTTF).

Figure 3:
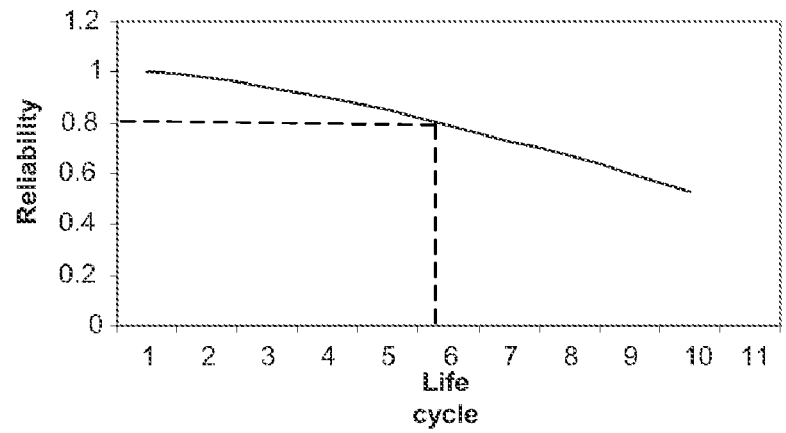
FIG. 3 is a graph showing reliability as a function of equipment life cycle (i.e. time, which is expressed in arbitrary units), indicating the need for preventive maintenance to ensure a minimum reliability.

Within many industrial applications, it is desirable that there is a minimum reliability limit for certain equipment. For example, this can be due to safety reasons or quality assurance. FIG. 3 shows an example reliability curve (solid line) as a function of the life cycle of the apparatus (i.e. time). From such a curve, the upper limit on the preventive maintenance interval (i.e. the maximum preventive maintenance interval) to achieve a minimum reliability can easily be determined. For example, assuming that the reliability of the apparatus/ system must be maintained above 0.8, then the dotted line indicates the corresponding maximum time interval that can be utilised prior to preventive maintenance being required so as to maintain the desired minimum reliability. From such a relationship curve between reliability and apparatus as a function of time (i.e. apparatus life cycle) a limit of the interval of preventive maintenance can be readily obtained.

Figure 4:
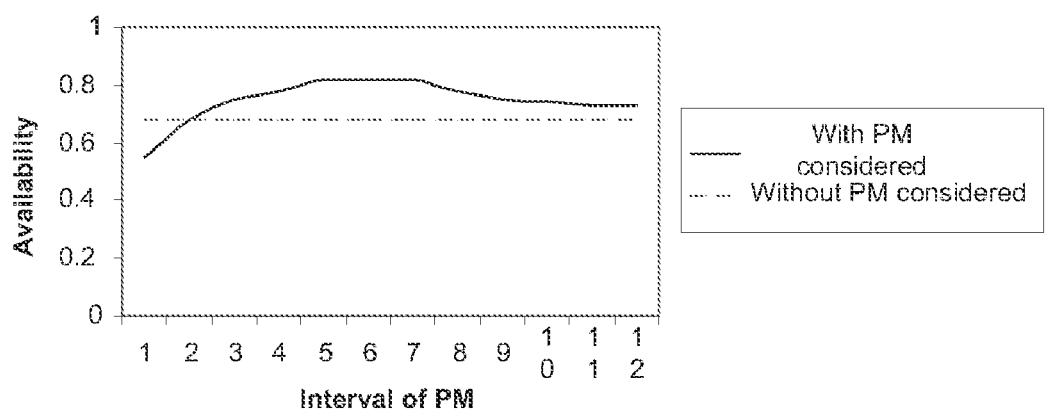
FIG. 4 is a graph indicating how availability can vary as a function of time (which is expressed in arbitrary units)

Relationship between Availability and Preventive Maintenance. FIG. 4 illustrates the general relationship between availability and the interval of preventive maintenance (solid line). The dotted line in FIG. 4, showing no variation in availability with the variation in interval of preventive maintenance corresponds to the assumption that is used in prior art methods.

The achieved availability is closely related to the interval of preventive maintenance. Preventive maintenance has a positive effect on the time to failure i.e. it increases the time to failure. However, the longer the preventive maintenance interval, the less the effect of preventive maintenance on MTTF. On the other hand, it is undesirable to have very short preventive maintenance intervals. Each session of preventive maintenance will take a finite period of time, and very short preventive maintenance intervals (resulting in frequent preventive maintenance tasks or sessions) will decrease the equipment uptime. At the extreme (the position to the left of the point at which the solid line crosses below the dotted line in FIG. 4), the frequent preventive maintenance sessions results in the availability being less than the inherent availability of the apparatus. As the preventive maintenance increases, the achieved availability reaches a maximum point, and then gradually approaches the inherent availability. Achieved availability was of course defined in equation (9), as a function of MTBM (Mean Time Between Maintenance) and M (Mean System Down Time), and includes both scheduled and unscheduled downtime.

The Mean Time Between Maintenance and the Mean System Down Time can respectively be defined by:

$$MTBM = \frac{\text{Life Cycle}}{\text{Total No. of Maintenance in Life Cycle}} \quad (20)$$

$$M = \frac{MTTR \times \text{No. Corrective Maintenance in life cycle} + MTPM \times \text{No. Preventive Maintenance in life cycle}}{\text{Total No. of Maintenance life cycle}} \quad (21)$$

where MTTR (Mean Time To Repair) is the average time taken to repair the equipment after a failure, and MTPM (Mean Time to perform Preventive Maintenance) is the average time taken to perform each preventive maintenance session. As with other RAM data, values for the parameters MTTR and MTPM can be found from historical data, published reference books, or by analysing the performance of equipment in use.

If $t_d$ is the life cycle of the equipment and $T_{PM}$ is the preventive maintenance interval for the equipment, then the number of preventive maintenance sessions can be calculated as $t_d/T_{PM}$. The expected number of failures of the apparatus will depend upon the repair process carried out when a failure takes place. Corrective maintenance can be regarded as recovering a system to be either as good as new or as good as old. For example, if the repair consists of replacing or restoring only a small percentage of the parts or components composing the system or apparatus, after the repair the system will be in approximately the same state it was in just prior to failure, in which case the corrective maintenance is regarded as recovering the system to "As Good As Old" (AGAO).

On the other hand, if the corrective maintenance restores the system to its original condition, the corrective maintenance can be regarded as restoring the system to "As Good As New" (AGAN).

If the parameter $m(t_d)$ is defined as the average number of failures of the equipment over the equipment design life (i.e. life cycle), then this parameter can be calculated as follows for respectively AGAN and AGAO:

$$m(t_d) = \begin{cases} t_d / MTTF & AGAN \\ \lambda_{average} \cdot t_d & AGAO \end{cases} \quad (22)$$

where $\lambda_{average}$ is the average failure rate (further details provided below, with reference to equation (26)).

The achieved availability $A_a$ can hence be calculated as:

$$A_a = \frac{MTBM}{MTBM + \overline{M}} = \frac{t_d}{t_d + MTTR \cdot t_d / MTTF + MTPM \cdot t_d / T_{PM}} \quad (23)$$

Replacing MTTF by the function $$MTTF = \theta\Gamma\left(1 + \frac{1}{\beta}\right)$$

$$A_a = \frac{MTBM}{MTBM + \overline{M}} = \frac{t_d}{t_d + MTTR \cdot t_d / \theta\Gamma\left(1 + \frac{1}{\beta}\right) + MTPM \cdot t_d / T_{PM}} \quad \text{for } AGAN \quad (24)$$

$$A_a = \frac{MTBM}{MTBM + \overline{M}} = \frac{t_d}{t_d + MTTR \cdot \lambda_{average} \cdot t_d + MTPM \cdot t_d / T_{PM}} \quad \text{for } AGAO \quad (25)$$

As indicated with respect to equation/function (22), the average failure rate $\lambda_{average}$ can be used to calculate the average total number of failures of equipment over the expected life cycle, assuming that corrective maintenance recovers the equipment to be AGAO (As Good As Old). The average failure rate can be defined as:

$$\lambda_{average} = \frac{\int_0^{\text{Life Cycle}} \lambda(t)dt}{\text{Life Cycle}} \quad (26)$$

Substituting for the definition of reliability as defined in function (1), and the life cycle of the equipment as $t_d$, provides the average failure rate as:

$$\lambda_{average} = \frac{-\ln(R(t_d))}{t_d} \quad (27)$$

Consequently, the achieved availability of the equipment, assuming AGAO repair maintenance, can be described by the function:

$$A_a = \frac{MTBM}{MTBM + M} = \frac{t_d}{t_d + MTTR \cdot (\ln(Rt_d)) + MTPM \cdot t_d / T_{PM}} \quad (28)$$

System Reliability Model. In analysing the reliability, availability and maintainability of a compact system, it is possible to utilise two approaches. One approach is to determine an appropriate reliability or reliability model for each component of the system, and compute the system reliability by applying the rules of probability according to the configuration of the components within the system.

An alternative approach is to find a particular failure law or function that may be applied to the entire system, and then apply RAM methodology at the system level. Such an alternative approach can significantly decrease the complexity of the calculations required to determine the optimum parameters for the system, and may be implemented in embodiments of the present invention. This system level approach will now be considered in more detail.

Components (apparatus) within a system can be considered as being either in parallel or in a serial configuration.

Figure 5:
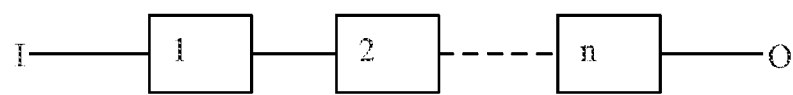
FIGS. 5, 6 and 7 illustrate conventional reliability block diagrams for respectively components in series, components in parallel and a processing system comprised of components in combined series/parallel.

All components in a series configuration must normally function for the system to function. In other words, for a serial configuration, all components are considered critical in the sense that their function must be performed in order for the system to continue to perform. If any of n serially related components fail, then the system will fail. FIG. 5 illustrates a RBD (Reliability Block Diagram) for n components in series.

Reliability Block Diagrams (RBD) resemble schematic representations of systems, with the connections between the systems/components/apparatus symbolising the interdependency and functioning of the systems. RBD provide a bridge, transforming a processed flow sheet into a reliability diagram on the basis of the logical connection between the different apparatuses, rather than on the basis of product flow.

If each component 1, 2, . . . n in the serial system shown in FIG. 5 has a respective independent failure rate $\lambda_1(t), \lambda_2(t) \ldots \lambda_n(t)$ and a respective reliability $R_1(t), R_2(t) \ldots R_n(t)$, the system reliability $R_s(t)$ can be generalised as the product of the individual reliabilities i.e.

$$R_s(t) = R_1(t) \times R_2(t) \times \ldots \times R_n(t) \quad (29)$$

Figure 6:
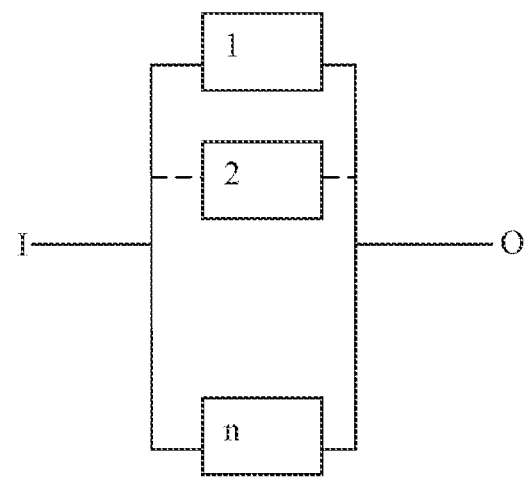

On the other hand, in a parallel configuration, only one component needs to function for the system to function (assuming that the components in parallel provide redundancy i.e. the components perform similar functions within the system). For parallel systems, all of the components in a parallel, or redundant, configuration must fail for the system to fail. If one or more of the components operates, then the system continues to operate. FIG. 6 shows a reliability block diagram for parallel units 1, 2, . . . n. In such a parallel system, the system reliability $R_s$ can be generalised as:

$$R_s(t) = 1 - \prod_{i=1}^{n} (1 - R_i(t)) \quad (30)$$

Figure 7:
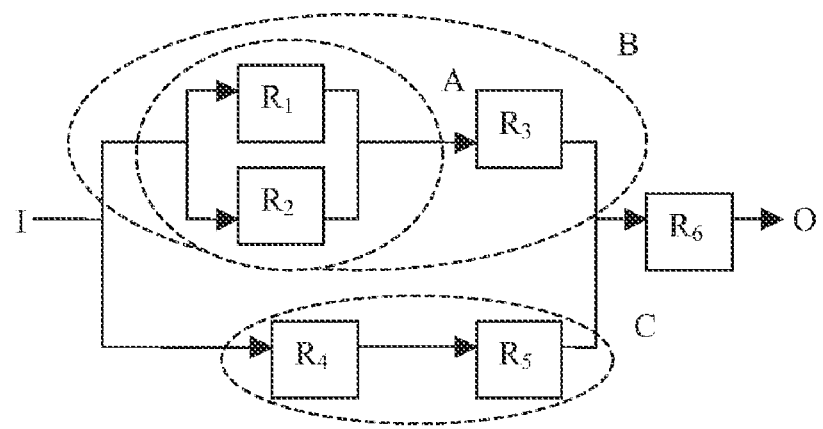

FIG. 7 illustrates a more complex system, including components in a combined series/parallel system. The reliability (R1-R6) of each component is indicated within the figure. To simplify the computation of the system reliability, the network can be broken down into a number of serial or parallel sub-systems (as indicated by dotted lines, and labelled A, B and C). The respective reliability of each sub-system ($R_A$, $R_B$, $R_C$) can be found using equations 29 and 30. The total system reliability can then be obtained on the basis of the relationship between the different sub-systems.

For example, for the network illustrated in FIG. 7, the sub-systems A, B, C have the following reliabilities:

$$R_A = [1-(1-R_1)(1-R_2)] \quad (31)$$

$$R_B = R_A(R_3) \quad (32)$$

$$R_C = R_4(R_5) \quad (33)$$

Combining these equations, to take into account the fact that sub-systems B and C are in parallel with each other and in series with $R_6$, then the total system reliability $R_s$ for the system shown in FIG. 7 can be expressed as:

$$R_s = [1-(1-R_B)(1-R_C)](R_6) \quad (34)$$

It should be appreciated that the above equations can also be utilised to calculate system (or sub-system) availability, simply by replacing the reliability terms $R_i$ by corresponding availability terms A.

As indicated above, it is possible for the system reliability and availability to be calculated based upon the individual apparatus reliability and availability i.e. appropriately summing the reliabilities and availabilities of each individual apparatus (component or piece of equipment) within a system e.g. using equations (29) & (30).

To simplify computation, the present inventors have realised that it can be desirable, particularly in complex systems, to linearise one or more of the functions, such as functions based on the Weibull distribution. For example, the Weibull distribution function can be approximated by assuming it is composed of a series of straight lines of predetermined gradient, with each straight line corresponding to a predetermined time interval (as opposed to the function continuously varying with time).

In complex systems with many components, it can be extremely time-consuming to linearise the reliability function for every single item of equipment, to determine the overall reliability function (and the same concept applies for the availability function). Accordingly, below is described how the system reliability and availability functions can be approximated.

System Reliability Model. Assuming a system comprises n serially related components or has n independent failure modes, with each mode or component having an independent Weibull failure distribution with shape parameter β and scale parameter $\theta_i$, then the system failure rate function λ(t) can be determined by:

$$\lambda(t) = \sum_{i=1}^{n} \frac{\beta}{\theta_i} \left(\frac{t}{\theta_i}\right)^{\beta-1} = \beta t^{\beta-1} \left[\sum \left(\frac{1}{\theta_i}\right)^{\beta}\right], \quad (35)$$

as the Weibull failure rate definition is:

$$\lambda(t) = \frac{\beta}{\theta}\left(\frac{t}{\theta}\right)^{\beta-1} \quad (36)$$

Consequently, the system has a Weibull distribution, having a shape parameter $\beta$ and a scale parameter $\theta$ where:

$$\theta = \left[\sum \left(\frac{1}{\theta_i}\right)^\beta\right]^{1/\beta} \quad (37)$$

$$\beta = \beta_i, \quad (38)$$

allowing the system reliability $R_{sys}(t)$ to be expressed as:

$$R_{sys}(t) = \exp\left[-\left(\frac{t}{\theta}\right)^\beta\right], \theta > 0, \beta > 0, t \geq 0 \quad (39)$$

In other words, the system reliability model assumes a Weibull failure distribution for the entire system. The system Weibull parameters $\theta$, $\beta$ can be determined from equations 37 and 38. Utilising such a failure distribution for the entire system avoids the need to calculate the reliability of each single item of equipment or apparatus. Thus, the computational requirements are much simpler. As with other functions, the resulting function of $R_{sys}(t)$ indicated in equation (39) can also be linearised to further decrease computational requirements when optimisation is performed.

System Availability Model. As per the system reliability, the same principle can be applied to the system availability i.e. it can be assumed that the system has its own MTBM (Mean Time Between Maintenance) and M (Mean Down Time). Hence, taking into account the different repair processes outlined above, the system availability $A_{a,sys}$ can be calculated by: For AGAO repair process, $$A_{a,sys} = \frac{MTBM_{sys}}{MTBM_{sys} + M_{sys}} \quad (40)$$

$$= \frac{t_d}{t_d + MTTR_{sys} \cdot (\lambda_{average} \cdot t_d) + MTPM_{sys} \cdot t_d / T_{PM,sys}}$$

and for AGAN repair process, $$A_{a,sys} = \frac{MTBM_{sys}}{MTBM_{sys} + M_{sys}} \quad (41)$$

$$= \frac{t_d}{t_d + MTTR_{sys} \cdot t_d / MTTF_{sys} + MTMP_{sys} \cdot t_d / T_{PM,sys}}$$

where $t_d$ is the life cycle of the system. The system Mean Time To Repair can be calculated by:

$$MTTR_{sys} = \frac{\sum_i MTTR_i}{\sum i} \quad (42)$$

and the system Mean Time To Perform preventive maintenance by:

$$MTPM_{sys} = \frac{\sum_i MTPM_i}{\sum i} \quad (43)$$

and as indicated above, the system reliability can be determined by the function in equation (39) i.e.

$$R_{sys}(t_d) = \exp\left[-\left(\frac{t_d}{\theta}\right)^\beta\right] \quad (39)$$

where $\theta,\beta$ are the system Weibull parameters. $T_{PM,sys}$ is the system preventive maintenance interval, which is typically a variable to be optimised within preferred embodiments of the present invention.

Superstructure Model. In process synthesis, all process candidates are embedded into a superstructure, and then the superstructure optimised so as to select the best solution i.e. a superstructure is defined indicative of a predetermined range of apparatus options within the processing system, with constraints indicative of feasible interconnections between each apparatus and parameters indicative of performance criteria associated with the apparatus, and then the superstructure analysed with respect to predetermined criteria so as to determine a preferred arrangement of apparatuses within the processing system. It will be appreciated that in order to consider RAM issues during the process synthesis (optimisation of the apparatus used within the processing system), the superstructure RAM needs to be defined i.e. the parameters indicative of the RAM associated with each apparatus within the predetermined range of apparatus options.

The above described system reliability and maintainability models are applicable for superstructure. However, so as to further simplify the mathematical processing required to optimise the superstructure, it is desirable for the superstructure availability to reflect different possible operational modes of the processing system e.g. to reflect different arrangements of apparatuses within the processing system and operational modes of such arrangements (e.g. due to an apparatus in the arrangement failing).

The superstructure system availability (SSA) can be defined as $$SSA = \frac{\text{Real Throughput}}{\text{Ideal Throughput}} \quad (44)$$

Expression (44) can be transformed into a mathematical expression based upon the superstructure characteristics.

For example, assume a given superstructure embeds n feasible options, and each of the options has m kinds of different operation scenario. For the $j^{th}$ scenario, $A_j$ is the probability the scenario happens, and $x_j$ is the capacity usage in the $j^{th}$ operation mode.

Then, the SSA can be expressed as:

$$SSA = \sum_{i=1}^{n} Y_i \times \sum_{j=1}^{m} A_j \times X_j \quad (45)$$

where:
i=$i^{th}$ option in a given superstructure,
0<i≦n, where n is the total number of feasible flowsheet option,
j=$j^{th}$ operation mode in the chosen $i^{th}$ flowsheet option,
0<j≦m, where m is the total number of operation modes for $i^{th}$ flowsheet option,
$Y_i$=1 when the $i^{th}$ flowsheet option is chosen or 0 when it is not chosen, $$\sum_{i=1}^{n} Y_i = 1,$$

$A_j$=the probability of system in operating mode j,
$X_j$=ratio of actual to maximum capacity in operation mode j.

Equation (45) would generally only be used to describe the definition of SSA, and not used in the superstructure optimisation, as it is relatively difficult to compute an optimum solution when binary variables are multiplied by continuous variables.

By way of example, a heat exchanger network design will now be described, with reference to FIGS. 8A-8F.

The heat exchanger system can comprise two identical heat exchangers, HX-1 and HX-2. When HX-1 and HX-2 are in parallel, HX-1 has flowrate F1 while HX-2 has flowrate F2, and the total flowrate for the system is F.

$$F_1 + F_2 = F \quad (46)$$

Figure 8A:
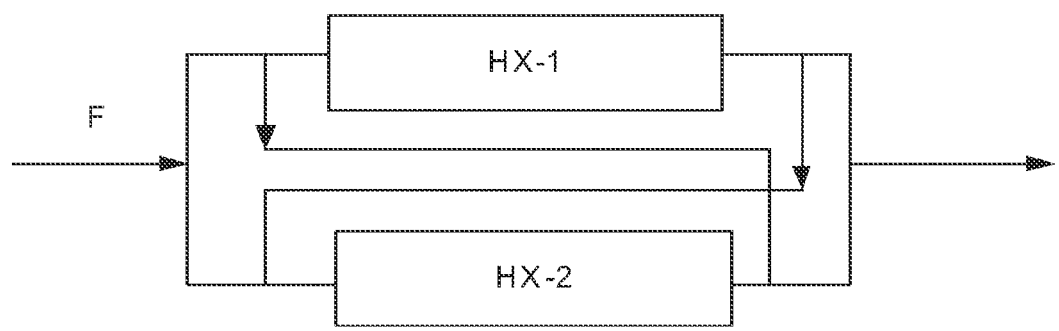
FIG. 8A is a superstructure block diagram indicating the possible connectivity of two heat exchangers.

The superstructure is illustrated in FIG. 8A. The superstructure covers the different implementation options of the heat exchanger system illustrated in FIGS. 8B-8F.

Figure 8B:
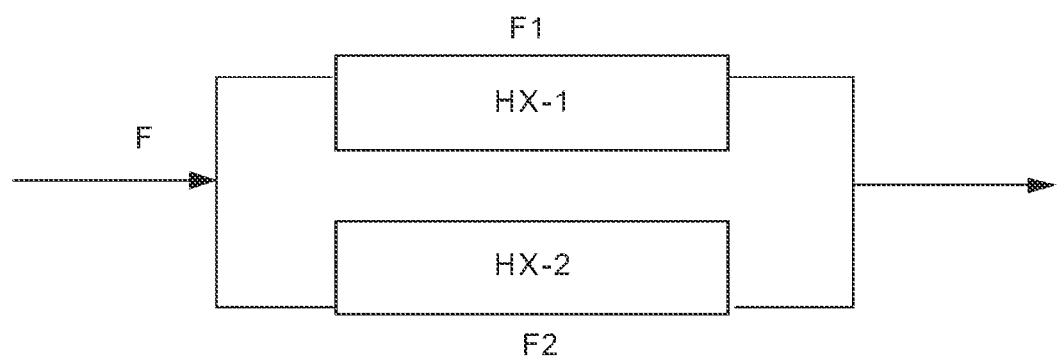
FIGS. 8B-8F are block diagrams indicating how the availability of the two heat exchangers in FIG. 8A can respectively result in both heat exchangers being available in a number of different configurations, or only one or the other heat exchanger being available.
Figure 8C:
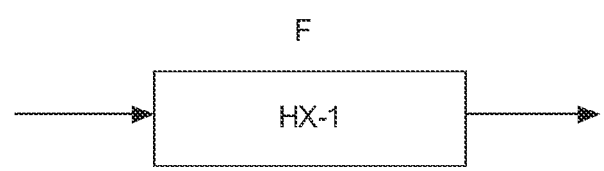
Figure 8D:
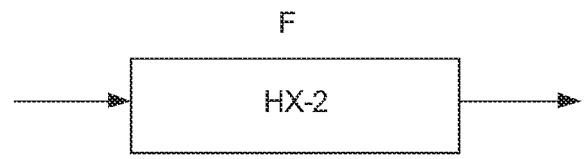
Figure 8E:
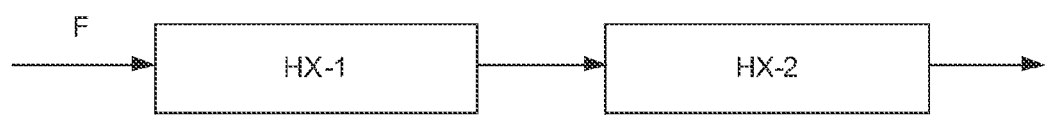
Figure 8F:
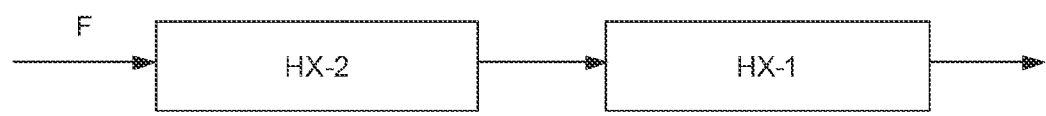

In FIG. 8B, the two heat exchangers HX-1 and HX-2 are connected in parallel. The flowsheet shown in FIG. 8B has three different operation modes:
(1) both HX-1 and HX-2 are in operation, and the system capacity usage is 1
(2) HX-1 is in operation but HX-2 is down, and the system capacity usage is $$\frac{F_1}{F}$$

(3) HX-1 is down but HX-2 is in operation, and the system usage is $$\frac{F_2}{F}.$$

FIGS. 8C-8F illustrate the other possible implementations of the heat exchanger system i.e. the heat exchanger system can contain only one heat exchanger (FIGS. 8C & 8D), or two heat exchangers connected in series (8E & 8F). For these other operation modes shown in FIGS. 8C-8F, there is only one operation scenario (i.e. if a heat exchanger breaks the system goes down), and the capacity usage is 1 when the system operates.

Using equation (45) the SSA of this example can be expressed as:

$$SSA = \quad (47)$$
$$\sum_{i=1}^{5} \left\{ Y_1 \times \left[ A_1 \times A_2 \times 1 + A_1 \times (1 - A_2) \times \frac{F_1}{F} + A_2 \times (1 - A_1) \times \frac{F_2}{F} \right] + \right.$$
$$Y_2 \times [A_1 \times 1] + Y_3 \times [A_2 \times 1] +$$
$$\left. Y_4 \times [A_1 \times A_2 \times 1] + Y_5 \times [A_1 \times A_2 \times 1] \right\}$$

Alternatively, the SSA can be expressed as:

$$SSA = \sum_{i=1}^{5} \left\{ Y_1 \times \left[ \sum_{j=1}^{3} A_j X_j \right] + Y_2 \times [A_1 \times 1] + \right. \quad (48)$$
$$\left. Y_3 \times [A_2 \times 1] + Y_4 \times [A_1 \times A_2 \times 1] + Y_5 \times [A_1 \times A_2 \times 1] \right\}$$

Here, $x_j$ is the different operation mode for the scenario shown in FIG. 8B, i.e. the system configuration in which heat exchangers HX-1 and HX-2 are operating in parallel. When both heat exchangers work, the system capacity usage is 1. When HX-1 operates and HX-2 fails, the system capacity usage is $F_1/F$. When HX-1 fails and HX-2 operates, the system capacity usage is $F_2/F$. Therefore, the system availability of the scenario in FIG. 8B can be expressed as $$\sum_{j=1}^{3} A_j \times X_j = A_1 \times A_2 \times 1 + A_1 \times (1 - A_2) + \frac{F_1}{F} + A_2 \times (1 - A_1) \times \frac{F_2}{F} \quad (49)$$

For the other scenarios indicated in FIGS. 8C-8F, the system does not have partial capacity usage, and the capacity usage is either 1 or 0 (a failure of one heat exchanger prevents the system working). Hence, the availability model for a fixed flowsheet can be used, which is introduced in the system availability model explanation.

$Y_i$ is a binary variable, a concept widely used in superstructure optimisation. When the $i^{th}$ scenario is chosen, $Y_i$=1. When the $i^{th}$ scenario is not chosen, $Y_i$=0. By using binary variables like this, the different feasible options in the superstructure are screened in terms of the objective function. As only one of the feasible options can ever be chosen, the sum of $Y_i$ must be 1.

The availability of arrangements of apparatuses can thus be calculated utilising the ratio of real to maximum capacity of different operational modes of the arrangement of apparatuses, and the relevant system availabilities. The capacity ratios can be calculated, for example, by using process synthesis mass equations. The system availabilities can be calculated using the system RAM models discussed above. Thus, the superstructure availability can be readily calculated using known variables, as discussed herein.

Cost. Once the superstructure has been defined with the relevant constraints, the superstructure is then analysed (i.e. optimised) with respect to predetermined criteria. The precise criteria will depend upon the objective of the optimisation.

For example, possible objectives could include maximisation of processing system output capacity, minimisation of initial capital investment cost to build/manufacture processing system whilst maintaining ongoing annual costs beneath a pre-determined limit etc.

Typically, the objective is to minimise the expected total annual cost (TCOST), subject to the various constraints placed upon the superstructure.

Superstructure constraints can generally be considered as being comprised of three main types: Process Model Constraints, Preventive Maintenance Constraints and Process System Availability Constraints.

Process Model Constraints includes the equalities and inequalities formulated in a model, which describe the desired process characteristics, and include mass and energy balance equations, equipment sizing equations and operational specification.

With regards to Preventive Maintenance Constraints, different processing systems (e.g. chemical plants) may have different specifications for equipment reliability, availability and maintainability so as to meet safety guidelines, quality assurance guidelines or similar. Such specifications can impact on preventive maintenance e.g. leading to constraints on the preventive maintenance interval. Further, in the process industry there are certain items of equipment that require both/all items of equipment to be maintained at the same time. For example, two items of equipment may be connected together, and due to quality assurance constraints or the connection between the two items of equipment, it may be a requirement that both items of equipment need to be maintained at the same time. Any such connection/correspondence between items of equipment should also be expressed in the optimisation model by Preventive Maintenance Constraints.

The Process System Availability of a new design (i.e. arrangement of apparatuses) is determined by what type of equipment/apparatus is chosen, and the connections between the equipment/apparatus. Such connections are reflected by process system availability constraints.

The final optimisation model, including any cost criteria, is typically formulated as a MINLP after linearization of the relevant reliability and availability functions. The optimum processing system (including an optimum arrangement of apparatuses), together with the optimum process model including optimum parameters determined using the process model constraints, is then determined by using an appropriate software package, such as GAMS.

As discussed above, in most process synthesis problems, the objective is to optimise the structure by minimisation of annual cost (or maximisation of annual profit). The total annual cost (TCOST) can be determined from:

$$TCOST = CCAP + COPE + CLOST + CMAN + COTHER \quad (50)$$

where
CCAP=Annualised Equipment Investment Cost
COPE=Annualised Operation Cost
CLOST=Annualised Lost Production Cost
CMAN=Annualised Maintenance Cost
COTHER=Annualised Other Costs (e.g. administrative or management cost or other facility cost not falling within the above other categories)

The Annualised Capital Cost (CCAP) is the main equipment cost and any other costs related to the main equipment e.g. the installation cost of equipment, the helper cost of the main equipment (i.e. the cost of any help equipment, provided to facilitate the operation of the main equipment), etc. The cost of each specific item of equipment/apparatus will be a function of the equipment size, materials of construction, and designed operating conditions (e.g. design pressure and design temperature). Such cost data can be presented as cost versus capacity charts, or expressed as a power law associated with the capacity i.e.

$$C_E = C_B \left( \frac{Q}{Q_B} \right)^M \quad (51)$$

where $C_E$ is the cost of the apparatus/equipment having a capacity Q, $C_B$ is the known (base) cost for the same item of apparatus/equipment having capacity $Q_B$, and M is a constant dependent on the type of equipment/apparatus e.g. see the book by Smith, Robin, "Chemical Process Design and Integration", John Wiley & Sons Ltd. (2005) p 11.

Alternatively, the equipment cost in any given year can be determined by reviewing the open literature e.g. the product guides of the equipment manufactures. Such equipment cost can then be updated to reflect future years by raising the equipment cost based upon the inflation rise e.g. taking into account the difference in cost index. For example, the equipment cost can be updated using the equation:

$$\frac{C_1}{C_2} = \frac{Index_1}{Index_2} \quad (52)$$

Where $C_1$ is the equipment cost in year 1, $C_2$ is the equipment cost in another year (year 2), and $INDEX_1$ & $INDEX_2$ are the cost indexes in respect of year 1 and year 2.

Further, if the money for capital expenditure is to be borrowed over a fixed period n years at a fixed rate of interest i, then the annualised capital cost can be calculated by:

$$\text{Annualized capital cost} = \text{capital cost} \times \frac{i(1+i)^n}{(1+i)^n - 1} \quad (53)$$

The annualised operation cost (COPE) can include the cost of:
(i) $C_{RM}$—raw materials,
(ii) $C_{CAT}$—catalysts and chemicals consumed in manufacturing other than raw materials,
(iii) $C_{Uti}$—utility operating costs, and
(iv) $C_{Labour}$—labour cost.

The annualised operation cost (COPE) can be calculated by:

$$\text{Annualized operation cost} = SSA \times (C_{RM} + C_{CAT} + C_{Uti} + C_{Labour}) \quad (54)$$

As can be seen, the Annualised Operation Cost is dependent upon the superstructure system availability (SSA). The four categories (i)-(v) comprising the operation cost will typically have different relative ratios, depending upon the particular processing system.

The lost production cost (CLOST) is the cost due to the process being unavailable. Plant availability is often a critical driver of the economic performance of a processing system in any process industry, and indicates the usage of the investment for the plant. The plant must usually have a high availability so as to be able to make a profit. When a plant is not available for operation, there are usually additional costs involved e.g. maintenance costs, raw material storage costs etc. Consequently, the lost production penalty when a plant is unavailable is not insignificant. For example, in a medium Liquefied Natural Gas (LNG) production line, the lost production penalty is approximately $50 per ton per day.

The annual lost production penalty or cost (CLOST) can be calculated as:

$$\text{Annualized lost production cost} = (1-SSA) \times F_{lost} \times P_{lost} \times D_{Designed} \quad (55)$$

where $F_{lost}$ is the lost production flow rate (e.g. in tons per hour), $P_{lost}$ is the lost production penalty (in dollars per ton) which will be dependent upon the value of the end product, and $D_{Designed}$ is the designed annual operating hours of the system/chemical plant.

The other cost (COTHER) is any cost which will occur, but is not included in the other categories e.g. facility cost or administrative cost.

Using the above methodology, the apparatuses within a processing system can be optimised in accordance with design criteria. By utilising a parameter associated with the apparatus that is indicative of at least one of the availability and reliability of the apparatus, expressed as a function of time, the optimisation method can be improved, leading to improved performance of the resulting processing system e.g. reduced annualised production cost. Preferably, each apparatus has both the availability and reliability of the apparatus expressed as a function of time, as well as expressed as a function of preventive maintenance. Any or all combinations of the above equations or parameters can be used within different embodiments.

By way of further explanation, two case studies will now be described, illustrating how the method described herein can result in improved processing system performance.

Case Study 1. This first case study is utilised to introduce the optimisation method and associated superstructure/model. The case study is a heat exchanger network problem, as described within the book by Christodoulos A. Floudas, et al, "Handbook of Test Problems in Local and Global Optimisation", Kluwer Academic Publishers (1999) 52-54.

Optimisation of heat systems can bring about significant savings, when the right balance between capital investment and operating cost is determined. Thus, heat exchanger network problems have been the subject of much prior art analysis. The present case study will show how appropriate consideration of RAM can lead to significant economic benefits over prior art techniques.

Figure 9:
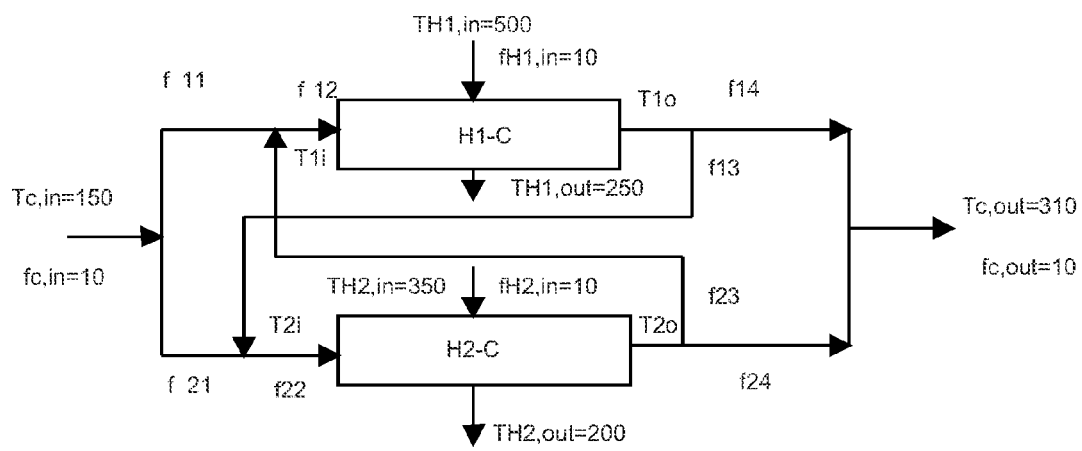
FIG. 9 is a superstructure illustrating a heat exchanger network comprising two heat exchangers and associated performance parameters.
Figure 10:
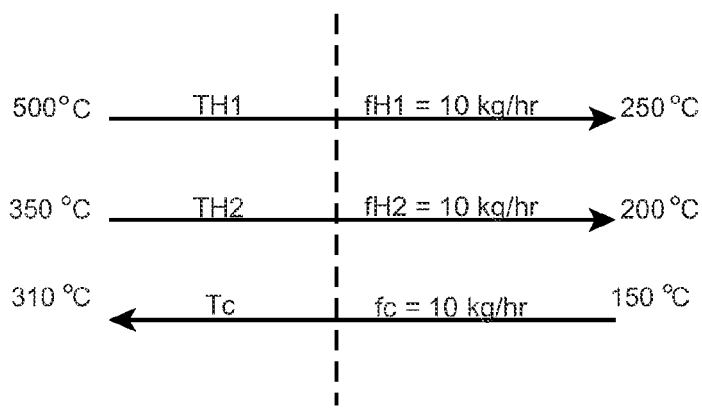
FIG. 10 illustrates the temperatures and mass flow rates associated with the flow streams through the heat exchanger network of FIG. 9.

FIG. 9 illustrates the superstructure of the heat exchanger network, with FIG. 10 showing the corresponding flow streams within the heat exchanger network. The network includes two heat exchangers H1-C and H2-C, with two hot flow streams (flow stream TH1 having a flow rate of fH1 10 kg/hr into H1-C, and flow stream TH2 of flow rate fH2 10 kg/hr into H2-C) and one cold stream (flow stream Tc of flow rate fc=10 kg/hr, which can be into either one or both heat exchangers H1-C and H2-C). As indicated in FIGS. 9 and 10, the total flow rates are fixed, as are the inlet and outlet temperatures. In particular, the first hot stream has an inlet temperature of 500° C., and an outlet temperature of 250° C., the second hot stream has an inlet temperature of 350° C. and an outlet temperature of 200° C., and the cold stream has an inlet temperature of 150° C. and an outlet temperature of 310° C.

The superstructure shown in FIG. 9 shows the possible interconnections between the two heat exchangers. As can be seen, the cold stream can be directed into either one or both of the heat exchangers. Further, the outlet of the cold stream from each heat exchanger can be directed into the inlet for the cold stream of the other heat exchanger. The parameters f11 and f21 indicate the flow rate from the cold stream (Tc, of total flow fc) directed respectively into the first heat exchanger H1-C and the second heat exchanger H2-C. The actual total flow rate into the cold stream inlet of the first heat exchanger H1-C is f12 (as a portion from the cold stream outlet of the second heat exchanger may also be directed into the inlet of the first heat exchanger), and that flow is assumed to be at temperature T1i. Correspondingly, the total flow rate into the cold stream inlet of the first heat exchanger is f22, and at temperature T2i.

The outlet temperature of the flow from the first heat exchanger H1-C is T1o, with the flow being split into two streams—one stream of flow rate f13 is directed from the cold stream outlet of the first heat exchanger towards the cold stream inlet of the second heat exchanger H2-C, whilst the other stream of flow rate f14 is directed towards the cold stream outlet. Correspondingly, the cold stream outlet from the second heat exchanger H2-C is at temperature T2o, and is split into a first flow of flow rate f23 directed towards the cold stream inlet of the first heat exchanger, and a second flow of flow rate f24 which is directed towards the cold stream outlet.

Such heat exchange networks are subject to blockages, and need to be taken off line periodically for cleaning. The objective of the case study is to minimise the annual production cost associated with the heat exchanger network, by considering the connectivity between the two heat exchangers e.g. whether the heat exchangers should be connected in series and/or parallel.

As previously described, the superstructure is optimised according to process model constraints, in conjunction with any preventive maintenance constraints and process system availability constraints. The objective of the optimisation (i.e. the criteria based upon which the analysis to determine the preferred arrangement of apparatuses is performed) is the minimisation of the expected annualised production cost.

The expected annualised production cost can be calculated by using equation (50) i.e.:

$$\text{TCOST} = \text{CCAP} + \text{COPE} + \text{CLOST} + \text{CMAN} + \text{COTHER} \quad (50)$$

As indicated in Christodoulos A. Floudas, et al, "Handbook of Test Problems in Local and Global Optimisation", Kluwer Academic Publishers (1999) 52-54, the annualised equipment investment cost can be calculated from:

$$CCAP = 1300 \cdot \left( \frac{1000}{\frac{1}{30} \cdot (\Delta T_{11} \Delta T_{12}) + \frac{1}{6} \cdot (\Delta T_{11} + \Delta T_{12})} \right)^{0.6} + \quad (56)$$

$$1300 \left( \frac{1000}{\frac{1}{30} \cdot (\Delta T_{21} \Delta T_{22}) + \frac{1}{6} \cdot (\Delta T_{21} + \Delta T_{22})} \right)^{0.6}$$

The remaining costs can be defined as follows:

$$\text{COPE} = T_d \cdot \text{PSA} \cdot (F_{RM} P_{RM} + F_{UTI} P_{UTI}) \quad (57)$$

$$\text{CLOST} = T_d \cdot (1 - \text{PSA}) \cdot F_{LOST} P_{LOST} \quad (58)$$

$$\text{CMAN} = T_d \cdot (1 - \text{PSA}) \cdot P_{MAN} \quad (59)$$

$$\text{COTHER} = C_{ADM} \quad (60)$$

where $T_d$ is the annual operation time of the heat exchanger, PSA is the process system availability, $F_{RM}$ & $P_{RM}$ are respectively the raw material flow rate and raw material cost, $F_{UTI}$ & $P_{UTI}$ are the utility flow rate and utility cost, $F_{LOST}$ & $P_{LOST}$ are the lost production flow rate and the lost production cost and $P_{MAN}$ is the maintenance cost, all of these being costs per hour. $C_{ADM}$ is the annualised administration or management cost.

The general annualised operation data of the heat exchanger (including values for many of the above parameters) is indicated in Table 1, with the annualised heat exchange reliability data being listed in Table 2.

TABLE 1

Heat Exchanger General Data

| | |
|---|---|
| Annual Operation Time ($T_d$) | 8760 hours |
| Lost Production Cost ($P_{LOST}$) | 20$/hour |
| Maintenance Cost ($P_{MAN}$) | 5$/hour |
| Utility Cost ($P_{UTI}$) | 0 (assumed) |
| Raw Material Cost ($P_{RM}$) | 4$/hour |
| Lost Production Flowrate ($F_{LOST}$) | 10 units/hour |
| Raw Material Flowrate ($F_{RM}$) | 10 units/hour |
| Utility Flowrate ($F_{UTI}$) | 20 units/hour |

TABLE 2

Heat Exchanger Reliability Data

| | |
|---|---|
| Mean Time to Repair | 100 hours |
| Mean Time to Failure | 1200 hours |
| Mean Time of PM | 13 hours |
| The Interval of PM | 1000 hours |

As will be appreciated from the superstructure indicated in FIG. 9 and network flow diagram indicated in FIG. 10, the process model constraints can be written as:

$f_{11}+f_{21}=10$ $f_{11}+f_{23}-f_{12}=0$ $f_{21}+f_{13}-f_{22}=0$ $f_{14}+f_{13}-f_{12}=0$ $f_{24}+f_{23}-f_{22}=0$ $150f_{11}+T_2f_{23}-T_1f_{12}=$ $150f_{21}+T_1f_{13}-T_2f_{22}=0$ $f_{12}(T_{1o}-T_{1i})=1000$ $f_{22}(T_{2o}-T_{2i})=600$ $\Delta T_{11}+T_{1o}=500$ $\Delta T_{12}+T_{1i}=250$ $\Delta T_{21}+T_{2o}=350$ $\Delta T_{22}+T_{2i}=200$ The process model constraints thus indicate the equalities and inequalities formulated in the optimisation model, describing the process characteristics, including mass and energy balance equations i.e. in this instance flow rates and temperatures of the streams within the heat exchanger network.

Using the previously derived equations, the RAM constraints can be defined as:

$PSA = A_1 \cdot A_2 \cdot (f_{13}+f_{23})/10 + A_1 \cdot (f_{11}-f_{13})/10 + A_2 \cdot (f_{21}-f_{23})/10$ where $A_1$ and $A_2$ are the respective availabilities of the first and second heat exchangers, as each determined by the system preventive maintenance interval, the system mean preventive maintenance time MTPM, and the MTTF and MTTR of each heat exchanger.

$T_{pm}$, the interval of preventive maintenance is utilised in order to calculate $A_1$, $A_2$. Typically, there will exist an optimal value of $T_{pm}$ which maximizes the SSA.

Figure 11:
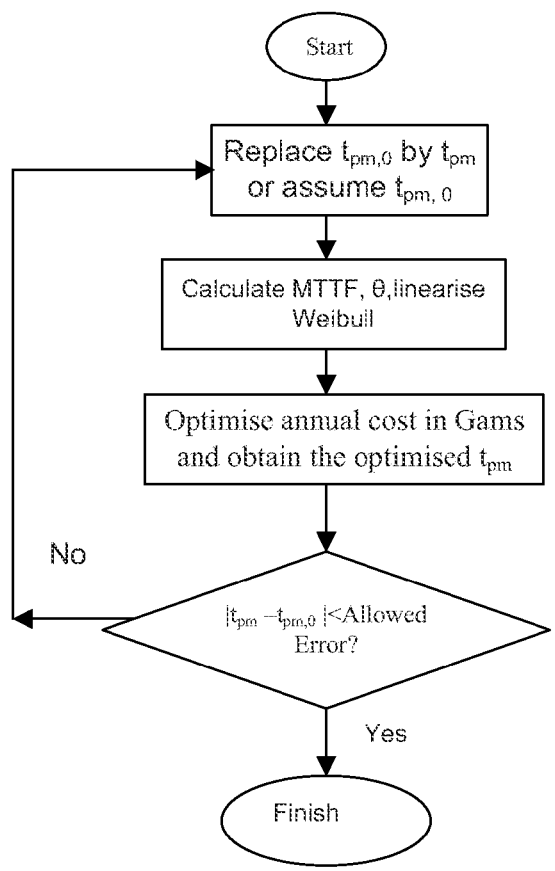
FIG. 11 is a flow chart illustrating the steps in optimising the superstructure of FIGS. 9 and 10.

FIG. 11 is a flow chart, which illustrates the iterative steps used to solve the model constraints. Firstly, an initial value for the interval of preventive maintenance is assumed, and then the relevant parameters calculated e.g. the MTTF, θ, and then the Weibull distribution of availability calculated. To allow easier calculations within the MINLP step, the Weibull availability function is then linearised i.e. rather than being a smooth, continuously varying function, the Weibull function is defined as (approximated by) a series of discrete values.

The optimum annual cost is then calculated using MINLP using a software package such as GAMS, and during the optimisation a value of the interval of preventive maintenance $T_{pm}$ is calculated. As indicated by FIG. 11, this calculation can be performed iteratively, using different values of $T_{pm}$.

Figure 12:
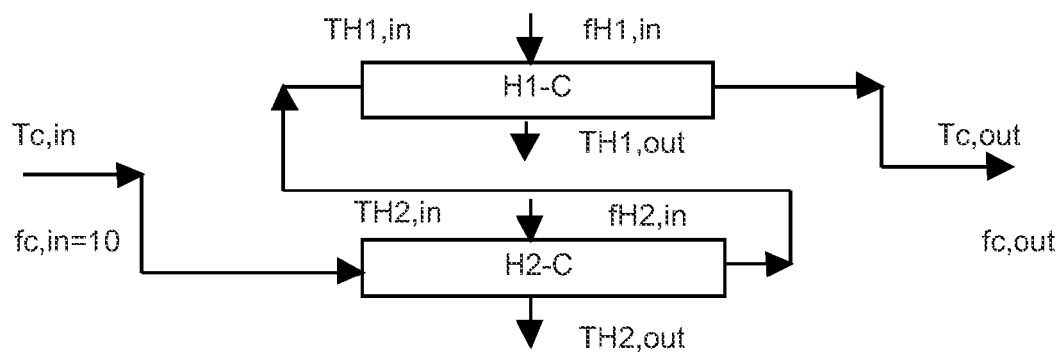
FIG. 12 is a schematic diagram indicating an optimal flow sheet output as a result of prior art optimisation techniques of the superstructure illustrated in FIGS. 9 and 10.
Figure 13:
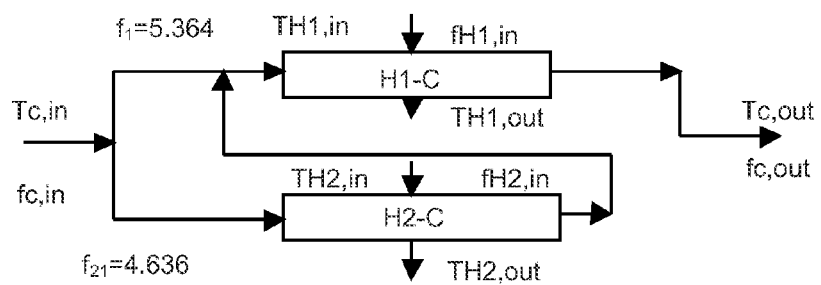
FIG. 13 is a schematic diagram indicating an optimal flow sheet output when RAM is taken into consideration when optimising the superstructure illustrated in FIGS. 9 and 10, in accordance with an embodiment of the present invention.

FIG. 12 illustrates the flow sheet when the optimisation is performed in accordance with prior art methods, with FIG. 13 indicating the resulting flow sheet when the optimisation is performed in accordance with an embodiment of the present invention, taking into account RAM.

It can be seen from FIG. 12 that the prior art design is to place the two heat exchangers in series, with the cold stream being first directed through the second heat exchanger H2-C and then through the first heat exchanger H1-C.

However, when RAM is considered, the optimal design changes, with the two heat exchangers being partially in parallel and partially sequential. The cold stream is directed into both heat exchangers, but the output of the second heat exchanger H2-C is only directed to the cold stream inlet of the first heat exchanger H1-C, such that the cold stream outlet comes only from the first heat exchanger. Operational data of the network has also been determined e.g. the relevant ratios of the inlet cold stream flow are indicated i.e. 5.364 kg/hr of the cold stream flow is directed towards the first heat exchanger, and 4.636 kg/hr towards the inlet of the second heat exchanger.

Table 3 compares the resulting annual cost data for this heat exchanger study, indicating how the prior art technique (without RAM being considered) is significantly more expensive than the design when RAM is considered. In particular, when RAM is considered, the optimised design has a lower annual cost of approximately 16%.

TABLE 3

| | Without RM is considered | With RAM is considered |
|---|---|---|
| Capital cost | 0.48 × 10$^4$$ | 0.61 × 10$^4$$ |
| Low Production Cost | 2.63 × 10$^4$$ | 1.4 × 10$^4$$ |
| Maintenance Cost | 0.66 × 10$^4$$ | 0.36 × 10$^4$$ |
| Raw Material Cost | 3.0 × 10$^4$$ | 3.2 × 10$^4$$ |
| Total Annual Cost | 6.7 × 10$^4$$ | 5.6 × 10$^4$$ |
| Cost Reduction | Base | 10% |

It will be observed that when RAM is not considered, the optimal design has a lower capital cost, but poorer reliability. This poor reliability results in more frequent breakdowns, which lead to increased maintenance cost and reduced operating time for the heat exchangers.

When RAM is considered, the optimal design has a slightly higher capital cost, which increases the cost that must be paid on equipment design and purchase. On the other hand, the design has improved reliability, and therefore requires less maintenance cost and provides greater operation time, leading to a large decrease in the expected lost production cost. These results demonstrate the significance of taking into account RAM during the initial design stage of a processing system.

Figure 14:
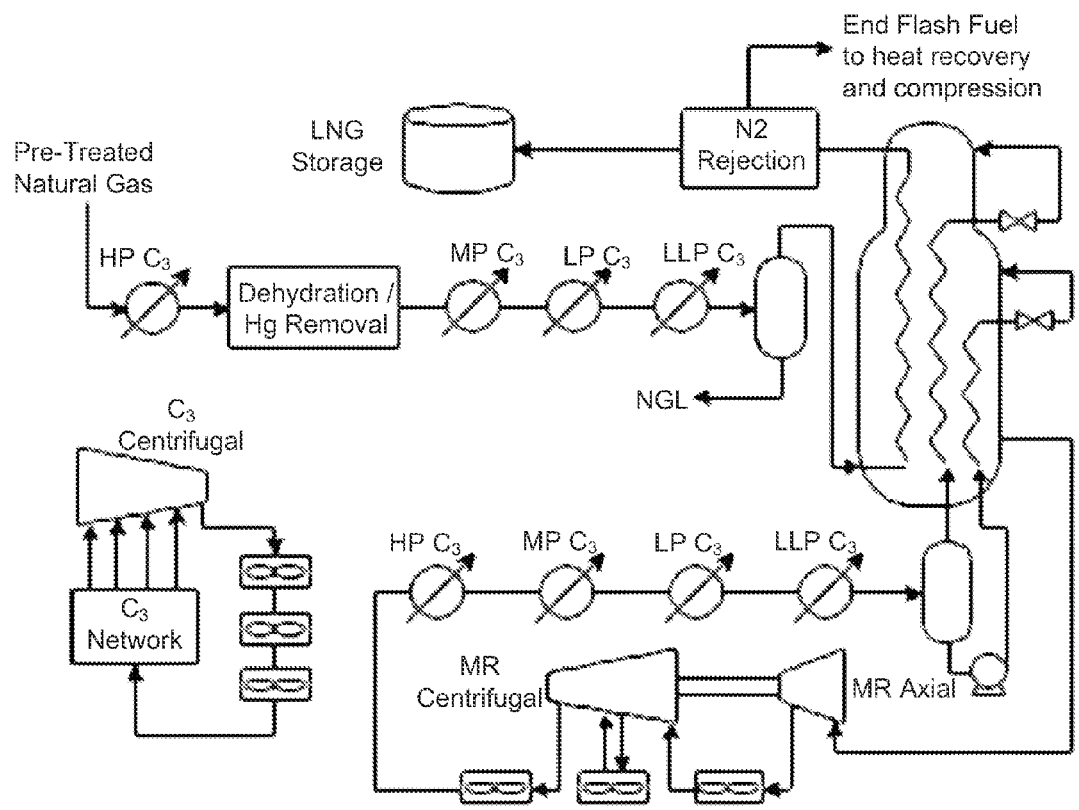
FIG. 14 is a schematic diagram of a simplified propane pre-cooled mixed refrigerant process.

Case Study 2. This second case study utilises the APCI's (Air Products & Chemicals Incorporated) Propane Pre-cooled Mixed Refrigerant liquefaction process. The case study was derived from a publication by Del Nogal, F. L. et al, Systematic Driver and Power Plant Selection for Power-Demanding Industrial Processes, AIChE, Spring Meeting 2005, Atlanta, the contents of which are incorporated herein by reference. A simplified flow sheet of the complete refrigerant process is illustrated in FIG. 14. Standard flow sheet notation is utilised within FIG. 14, as well as in the following FIGS. 15-18 which illustrate determined preferred process design arrangements. Full details of the standard design flowsheet shown in these Figures can be found in the Del Nogal publication.

The LNG (Liquefied Natural Gas) production capacity is 5 mtpa (million tons per annum). The process has the following parameters:
Feed gas at 60 bar and 25° C.
Average ambient temperature is 27° C.
Flow and compositions of process streams as illustrated in Table 4.
LPGs (Liquefied Petroleum Gases) are re-injected. Air coolers are utilised.

TABLE 4

|  | Feed Gas | LNG Product | End Flash Fuel |
|---|---|---|---|
| Flowrate (t/h) | 765.75 | 593.15 | 48.85 |
| Molar % |  |  |  |
| $N_2$ | 1.50 | 0.56 | 12.81 |
| $CO_2$ | 2.20 | -.- | -.- |

TABLE 4-continued

|  | Feed Gas | LNG Product | End Flash Fuel |
|---|---|---|---|
| C1 | 85.10 | 92.34 | 87.18 |
| C2 | 6.50 | 4.28 | 0.01 |
| C3 | 3.00 | 1.89 | -.- |
| i-C4 | 0.60 | 0.44 | -.- |
| n-C4 | 0.60 | 0.46 | -.- |
| i-C5 | 0.17 | 0.01 | -.- |
| n-C5 | 0.17 | 0.01 | -.- |
| C6+ | 0.16 | -.- | -.- |

The basis for the design was to provide a single liquefaction train producing 5 mtpa of LNG. The resulting refrigerant compressor demands (i.e. mechanical power demands) are provided in Table 5.

TABLE 5

| Compressor/Stage | Power Demand (MW) |
|---|---|
| C3/1 | 2.50 |
| C3/2 | 6.96 |
| C3/3 | 12.35 |
| C3/4 | 32.25 |
| Total C3 | 54.06 |
| MR/1 | 57.64 |
| MR/2 | 18.74 |
| MR/3 | 27.34 |
| Total MR | 103.72 |

Firstly, the most significant equipment affected by reliability within the refrigerant process was identified. From the published reliability data within OREDA Offshore Reliability Data Handbook 4th Edition, OREDA Participants (2002), the present inventors realise that gas turbines have a relatively low reliability, and are consequently the critical equipment within this refrigerant process in terms of reliability.

Consequently, within the reliability model, only gas turbines were considered. The data for the gas turbines considered within the range of apparatus options is listed in Table 6.

TABLE 6

| Type | Model | Output(kw) | Cost (k$) | MTMP* | MTTR** | MTTFO** | Beta | Alpha0 |
|---|---|---|---|---|---|---|---|---|
| Aeroderivative | LM1600PA | 14320.00 | 6500.00 | 6.00 | 15.90 | 926.14 | 2.00 | 1045.03 |
| Aeroderivative | LM2500PE | 23270.00 | 7800.00 | 7.00 | 23.70 | 1151.35 | 2.00 | 1299.16 |
| Aeroderivative | LM6000 | 44740.00 | 12500.00 | 10.20 | 31.50 | 1200.00 | 2.00 | 1354.06 |
| Industrial | M3142J | 11290.00 | 3345.00 | 6.00 | 32.60 | 2437.93 | 2.00 | 2750.91 |
| Industrial | MS5002D | 32590.00 | 7900.00 | 7.00 | 33.80 | 1117.05 | 2.00 | 1260.45 |
| Industrial | M5261RA | 19690.00 | 5200.00 | 7.00 | 32.60 | 2437.93 | 2.00 | 2750.91 |
| Industrial | M5382C | 28340.00 | 6900.00 | 7.00 | 33.80 | 1117.05 | 2.00 | 1260.45 |
| Industrial | M6511B | 37810.00 | 10200.00 | 10.20 | 33.80 | 1117.05 | 2.00 | 1260.45 |
| Industrial | M6581B | 38290.00 | 10300.00 | 10.20 | 33.80 | 1117.05 | 2.00 | 1260.45 |
| Industrial | M7111EA | 81560.00 | 17300.00 | 13.30 | 35.00 | 1200.00 | 2.00 | 1354.06 |
| Industrial | M7121EA | 86230.00 | 18400.00 | 13.30 | 35.00 | 1200.00 | 2.00 | 1354.06 |
| Aeroderivative | COBERRA6562 | 25930.00 | 7300.00 | 7.00 | 23.70 | 1151.35 | 2.00 | 1299.16 |
| Aeroderivative | COBERRA6761 | 32590.00 | 8300.00 | 7.00 | 23.70 | 1151.35 | 2.00 | 1299.16 |

Where, MTTF0 is Mean Time To Failure without preventive maintenance.

Alpha0 is corresponded to MTTF0

It can be seen that Table 6 includes 13 different types of gas turbine; all of these types of gas turbine were embedded within the optimisation model as design candidates i.e. the superstructure was defined indicating each of the thirteen gas turbines as apparatus options within the processing system. The performance criteria of each gas turbine was also indicated, as different types of gas turbine have different outputs, reliability and availability, as well as require different capital production costs and maintenance costs. A number of assumptions were made when defining the superstructure i.e. the models that were optimised to determine the preferred arrangement of apparatuses within the processing system used to provide the refrigerant process. Any one or more of the assumptions could be made within embodiments of the present invention. In particular, the following assumptions were made:

(1) both preventive maintenance and corrective maintenance recover the equipment to AGAN (As Good As New),
(2) the availability of certain apparatuses (motors and compressors) within the processing system is assumed to be one i.e. it is assumed that the motors and compressors are always available (so as to simplify the relevant calculation),
(3) corrective maintenance takes longer than preventive maintenance,
(4) lost production penalty of LNG is 0.05 K$/T (thousand dollars per ton),
(5) the plant design capacity is 5 mt/year (million tons per year),
(6) the optimisation model is arranged to minimise the annual LNG cost, with the total cost being the sum of the capital cost, operation cost and lost production cost,
(7) the other parameters are as listed in Table 7.

TABLE 7

| | Parameter | Value |
|---|---|---|
| Equipment | Maximum main motor size | 40 MW |
| | Maximum helper motor size | 25% of GT |
| | Maximum helper generator size | 25% of GT |
| | Power required for DDGT start up | 15% of GT |
| | Motor efficiency | 95% |
| | Helper generator efficiency | 95% |
| | Mechanical transmission losses | 1.5% |
| Electricity | Electricity distribution losses | 2% |
| | Maximum electricity export | 25 MW |
| | Maximum electricity import | 0 MW |
| | Price of sold electricity | 0 $/kWh |
| | Cost of imported electricity | 0 $/kWh |
| Fuel and $CO_2$ | Specific $CO_2$ emissions | 0.1999 kg/kWh (LHV) |
| | $CO_2$ emissions penalty | 0 $/ton |
| | Cost of end flash fuel | 0 $/kWh (LHV) |
| | Cost of fresh fuel | 0 $/kWh (LHV) |
| | Max. end flash fuel available | 540.2 MW (LHV) |
| Other | Plant lifetime | 25 yr. |
| | Interest rate | 4% |

The optimisation model is indicated in detail below. The model was optimised so as to minimise the LNG Life Cycle Cost (LCC), where LCC=Capital cost+Operation cost+Lost production cost.

Sets. Within the model, the following sets were defined:
T={t|t is the Gas Turbine position in the superstructure shown in FIG. 14}, t=1, 2, 3, 4
I={i|i is the Gas Turbine model option in the superstructure}, i=LM1600PA, LM2500PE, LM6000, M3142J, MS5002D, M5261RA, M5382C, M6511B, M6581B, M7111EA, M7121EA, COBERRA6562, COBERRA6761, as shown in Table 7.

The model also used the following parameters and variables:

Optimisation Parameters

| | |
|---|---|
| SLife | Calendar time in years |
| Mancost | Labour Cost, $/per person per hour |
| $MTTF_{i,0}$ | the $i^{th}$ Gas Turbine's inherent MTTF |
| $MTPM_i$ | the $i^{th}$ Gas Turbine's MTPM |
| $MTTR_i$ | the $i^{th}$ Gas Turbine's MTTR |
| DCAP | Daily Plant Capacity (tonne per scheduled day) |
| LNGCost | the LNG lost production penalty, k$/t |
| $\beta_i$ | the Weibull shape parameter |

Optimisation Variables

| | |
|---|---|
| Acm, | the system inherent availability |
| $A_{inh,i}$ | the $i^{th}$ Gas Turbine inherent availability |
| $A_{inh,t}$ | the inherent availability for Gas Turbine at position t |
| SCOST, | the life cycle cost |
| CCAP, | the capital cost on basis of the system configuration and equipment included in the system |
| CFUEL, | the fuel cost on basis of the system configuration |
| CCO2, | the CO2 emission cost |
| CIMP, | the cost of electrical import |
| SCLNG, | the lost production cost in life cycle |
| SMAN, | the maintenance labour cost |
| SDT, | the system total downtime |
| SMTPM, | the system mean time of PM |
| $MTTF_{i,pm}$, | the $i^{th}$ Gas Turbine's MTTF after PM |
| $MTTF_{t,pm}$ | the Gas Turbine's MTTF after PM at position t |
| $GTMTPM_t$ | the Gas Turbine's MTPM at position t |
| $GTMTTR_t$ | the Gas Turbine's MTTR at position t |
| Ns | the number of PM for the system |
| $T_{pm}$ | the interval of PM for the system |
| $R_i(t)$ | the reliability function for the ith Gas Turbine |
| $\theta_{i,0}$ | the Weibull scale parameter |
| $y_{t,i}$ | the binary variable, whether the $i^{th}$ Gas Turbine is chosen to be at position t (values = 0, when it is not chosen; 1, when it is chosen) |

Optimisation Equations
a) Cost Equations

SCOST=CCAP+CFUEL+CCO2+CIMP+SCLNG+SMan

SCLNG=SDT*DCAP/24*LNGCost

SMAN=SDT*Mancost b) Availability Equations $$SDT = (1 - Acm) \cdot Slife + Ns \cdot SMTPM$$

$$Acm = \prod_{i \in T} A_{inh,t}(t)$$

$$A_{inh,t} = \frac{MTTF_{t,pm}}{MTTF_{t,pm} + GTMTTR_t}, t \in T$$

$$Ns \cdot T_{pm} \leq Slife$$

$$(Ns + 1) \cdot T_{pm} \geq Slife$$

$$GTMTPM_t = \sum_{i \in I} y_{t,i} \cdot MTPM_i, t \in T$$

$$GTMTTR_t = \sum_{i \in I} y_{t,i} \cdot MTTR_i, t \in T$$

$$SMTPM = \text{Max}(GTMTPM_t, t \in T)$$

c) Gas Turbine Selection Equations $$\sum_{i \in TOP} y_{t,i} \leq 1$$

d) Gas Turbine MTTF after PM at Position t $$MTTF_{i,pm} = \frac{1/2 \cdot \text{erf}(T_{pm}/\theta_{i,o}) \cdot PI^{1/2} \cdot \theta_{i,o}}{1 - R_i(T_{pm})}$$

$$MTTF_{t,pm} = \sum_{i \in I} y_{t,i} \cdot MTTF_{i,pm}$$

e) The Weibull Parameters for the $i^{th}$ Equipment, $\theta_{i,o}$ $$\theta_{i,o} = \frac{MTTF_{i,o}}{\Gamma\left(1 + \frac{1}{\beta_i}\right)}$$

f) The Reliability for $i^{th}$ Equipment, $R_i(T_{pm})$ $$R_i(T_{pm}) = \exp\left[-\left(\frac{T_{pm}}{\theta_{i,o}}\right)^{\beta i}\right]$$

Prior art techniques were utilised within the original case study relating to the refrigerant process to arrive at two solutions. One solution is a single train design, in which one train (turbine arrangement) with full capacity carries the required output. The other solution is utilising two parallel trains, in which two identical trains, each of 50% capacity, carry the required output. Utilising such a parallel system is a common solution for increasing process availability and reducing lost production cost.

Figure 15:
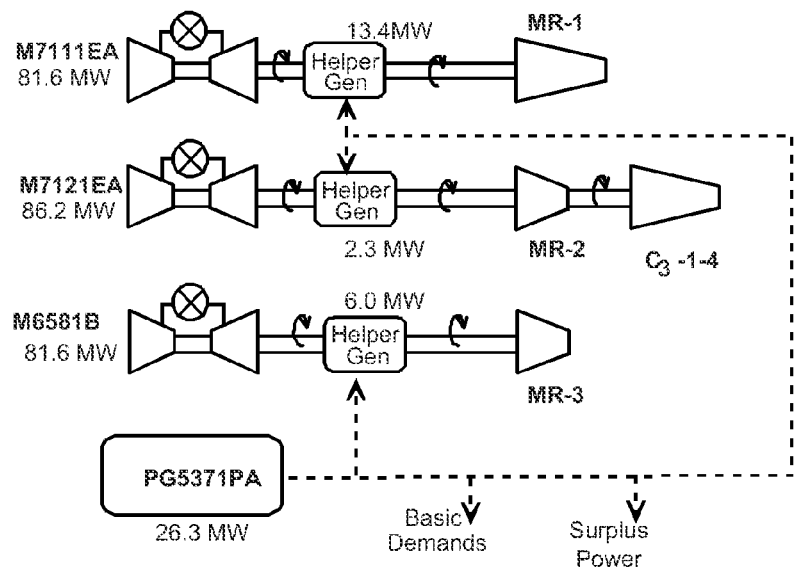
FIG. 15 illustrates a single system conventional optimal design of the gas turbines for use in the process illustrated in FIG. 14.
Figure 16:
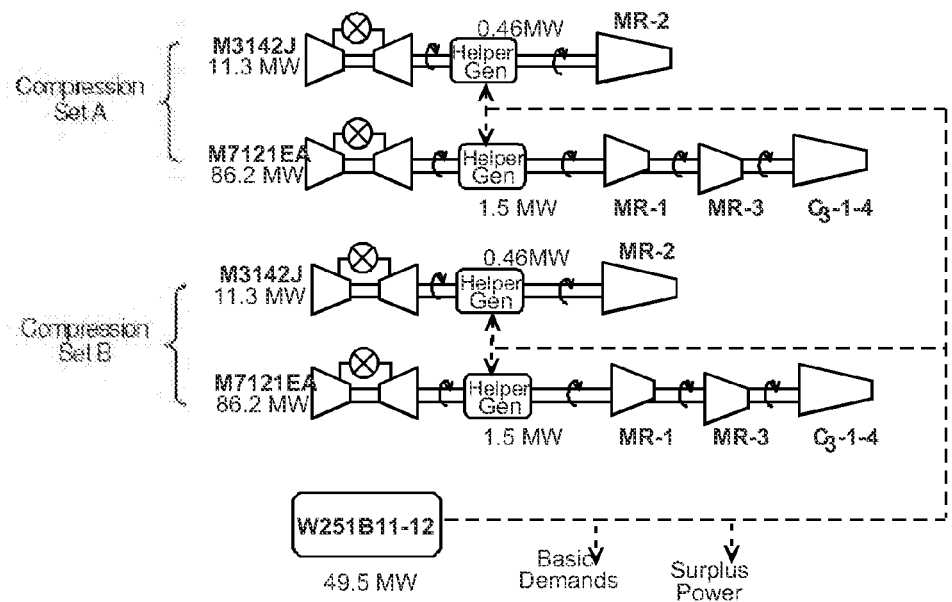
FIG. 16 illustrates a parallel system conventional optimal design of the gas turbines for use in the process illustrated in FIG. 14.

FIGS. 15 and 16 show respectively the optimal design for a single train system and the optimal design for a parallel system, as determined using prior art techniques i.e. without RAM considerations.

In the single train system illustrated in FIG. 15, three large gas turbines are chosen, at an annualised production cost of 20.68 million dollars.

FIG. 16 shows the parallel system optimal design, and includes two identical trains, each of which has one large size gas turbine and one small gas turbine. The annualised production cost of the design shown in FIG. 16 is 16.13 million dollars.

For the LNG mixed refrigerant process, the parallel systems can be seen to have a lower production cost, presumably due to better reliability i.e. if one train fails (e.g. compression set A), then the other train (compression set B) can continue to operate, and vice versa. Such a parallel system thus intrinsically increases reliability and availability of the total process. However, simply providing a parallel system does not automatically optimise the whole processing system, as the influence of preventive maintenance is not considered during the design stage. Thus, traditional design solutions are sub-optimal.

Using the methodology as described herein, a flow sheet was designed for both a single system (train) and a parallel system. These designs took into account a number of considerations.

Firstly, equipment availability was not considered as a constant, but was related to preventive maintenance schedule and the inherent features of the equipment. Secondly, the system availability was determined based not only on the inherent reliability of the equipment/apparatus utilised in the process/processing system, but also on the maintenance characteristics of the apparatus e.g. some gas turbines require a longer maintenance time. Consequently, a process consisting of different equipment will have different optimal preventive maintenance schedules and different optimal availability.

Figure 17:
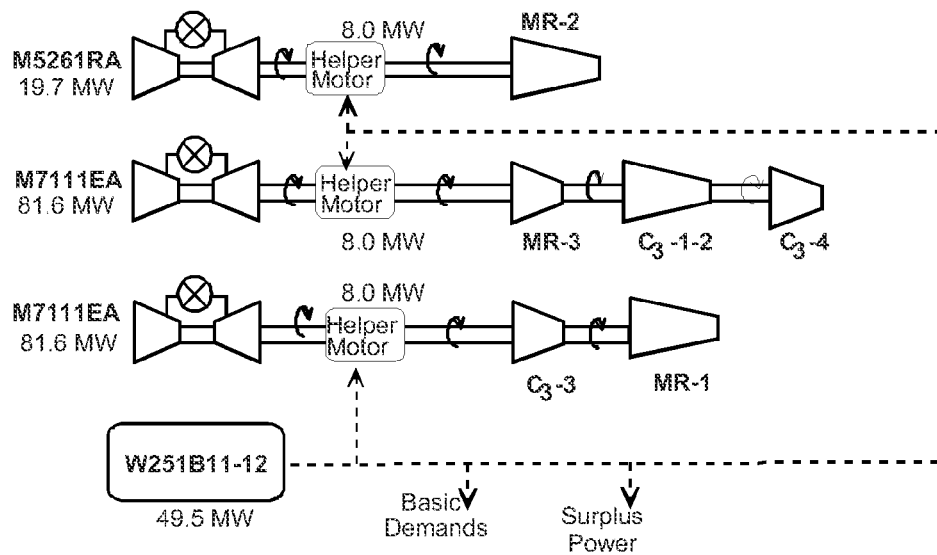
FIG. 17 is a single system optimal design for the turbines illustrated in FIG. 14, as determined in accordance with an embodiment of the present invention.
Figure 18:
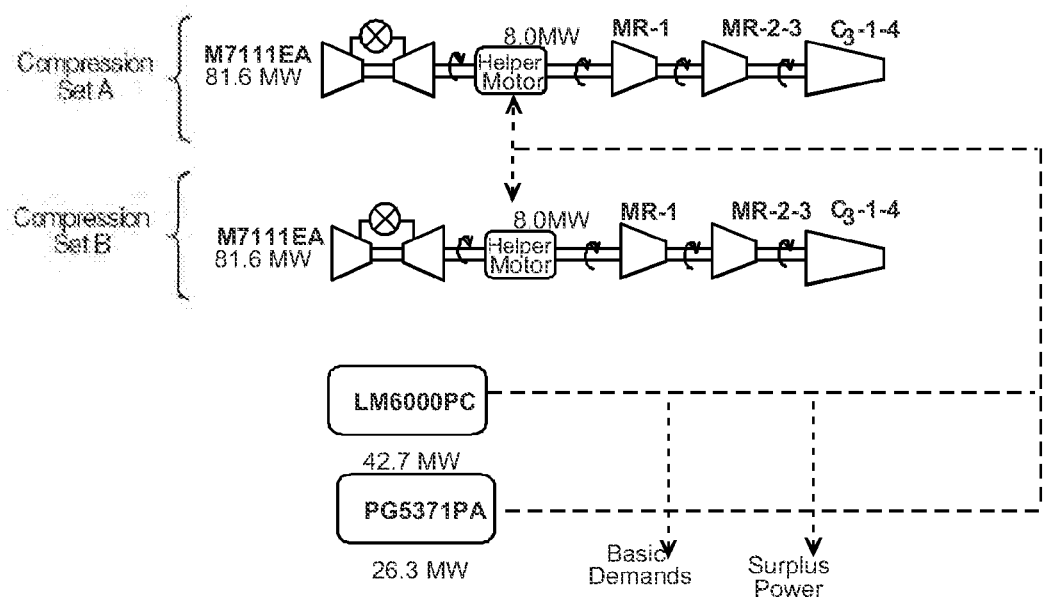
FIG. 18 is a parallel system optimal design for the turbines illustrated in FIG. 14, as determined in accordance with an embodiment of the present invention.

FIGS. 17 and 18 show respectively the single and parallel systems optimal solutions as determined when RAM is taken into consideration.

The single system optimal design shown in FIG. 17 includes two large gas turbines and one smaller gas turbine, and has an annualised production cost of 15.82 million dollars.

In the parallel system optimal solution shown in FIG. 18, again (as per the parallel system shown in FIG. 16), two identical trains were designed. However, each of them has only a single large gas turbine (as compared with the design trains in FIG. 16, which each had one large and one small gas turbine). The annualised production cost for the design shown in FIG. 18 is 13.37 million dollars.

Table 8 shows the annualised cost for the two single system designs i.e. the design shown in FIG. 15 and the design shown in FIG. 17.

TABLE 8

|  | Without RAM Study | With RAM Study |
|---|---|---|
| Capital Cost | 7.318 MM$ | 7.386 MM$ |
| Down Time | 449 Hours | 283 Hours |
| LNG Lost Production | 13.36 MM$ | 8.43 MM$ |
| Cost Reduction % | 20.68 MM$ | 15.82 MM$ |
|  | Base | 23.50% |

It will be observed that, in the prior art design without RAM, the design requires less initial capital, but has more down time than the design determined in accordance with the embodiments of the present invention that includes RAM. The higher down time of the prior art design results in a higher lost production cost. Based on the same basic assumptions, the optimum design determined taking into account RAM would annually cost 23% less than the original design. Table 9 indicates the annualised cost of the two parallel system designs.

TABLE 9

|  | Without RAM Study | With RAM Study |
|---|---|---|
| Capital Cost | 7.697 MM$ | 7.724 MM$ |
| Down Time (Half) | 512 Hours | 369 Hours |
| Down Time (Full) | 27 Hours | 17 Hours |
| LNG Lost Production | 8.429 MM$ | 6.006 MM$ |
| Total Annual Cost | 16.13 MM$ | 13.73 MM$ |
| Cost Reduction % | Base | 14.86% |

From Table 9, it can be seen that the prior art (without RAM) design again has a lower capital cost, but has increased down time, resulting in a higher lost production cost. Taking RAM into consideration results in a total cost reduction of almost 15%.

Typically, people chose parallel systems in order to increase system availability and reduce lost production cost. However, it is ironic that the prior art parallel design (without RAM) indicated in Table 9 has a lower availability than the single system design in accordance with an embodiment of the present invention (i.e. with RAM). By comparing the designs, it can be seen that system availability is not only related to inherent individual equipment reliability (as assumed in previous literature), but is also heavily related to the maintenance characteristics, preventive maintenance schedule and the reliability block diagram of which the equipment forms a part.

As part of the optimising process, when the optimal process structure and parameters are found from optimisation, the corresponding optimal maintenance schedule is also determined.

In the second case study, the corresponding optimal maintenance schedule for the single system design shown in FIG. 17 is twice per year. It was assumed that the operation time in one year was 8760 hours, and consequently the ideal time to perform preventive maintenance is every 4380 hours (each preventive maintenance session taking on average 11.2 hours). Following the same preventive maintenance schedule on the flow sheet of the corresponding single system prior art design, each preventive maintenance schedule should take on average 13 hours. However, within the industry, preventive maintenance is only scheduled once per year (based upon user experience), which gives worse availability than having two maintenance schedules each year.

Whilst the majority of the method of optimizing apparatuses described herein has been described with respect to the creation of a superstructure, it should be appreciated that the underlying technique can be carried out using any structural optimization technique.

For example, the structural optimization described herein can be carried out by the optimization of either a superstructure or by stochastic optimization.

The optimization of a superstructure technique utilises the creation of a reducible structure, known as a superstructure (i.e. a type of system model), that has embedded within it all feasible process options and all feasible interconnections that are candidates for an optimal design structure. The design problem is then formulated as a mathematical model. Some of the design features are continuous, describing the operation of each unit (e.g. flowrate, composition, temperature, pressure, etc), its size (e.g. volume, heat transfer area, etc.) as well as the costs or profits associated with the units. Other features are discrete (e.g. a connection in the design structure is included or not). Once the problem is formulated mathematically, its solution is carried out through implementation of an optimization algorithm. An objective function is maximized or minimized in a structural and parameter optimization. The optimization justifies the existence of structural features and deletes those features from the structure that cannot be justified. In this way the structure is reduced in complexity. At the same time, the operating conditions and equipment sizes are also optimized.

By way of contrast, stochastic optimization uses random choice to guide the search and can allow deterioration of the objective function during the search. As with the superstructure optimization, a system model is created, indicative of the range of apparatus options within the processing system, constraints of feasible interconnections between each apparatus, and constraints indicative of performance criteria associated with each apparatus. Stochastic optimization is then used to determine a preferred arrangement of apparatuses within the processing system. It is important to recognize that a randomized search does not mean a directionless search. Stochastic search methods generate a randomized path to the solution, based on probabilities. Improvement in the objective function becomes the ultimate rather than the immediate goal, and some deterioration in the objective function is tolerated, especially during the early stages of the search. Deterioration and improvement in the objective function are both allowed. This helps to reduce the problem of being trapped in a local optimum."

As has been shown by the above explanations and case studies, taking account of the availability and/or reliability of apparatuses, expressed as a function of time, can lead to designs have improved performance. The above description indicates how a systematic methodology can be utilised to incorporate RAM into process synthesis of chemical plants and similar chemical processing systems e.g. turbines and heat exchangers.

What is claimed is:

1. A computer-implemented method of optimising a processing system comprising a plurality of apparatuses, the method being implemented in a computer comprising a memory in communication with a processor, the method comprising:
    defining a system model indicative of a predetermined range of apparatus options within a processing system, constraints indicative of feasible interconnections between each apparatus and another apparatus, and parameters indicative of performance criteria associated with each apparatus;
    analysing, by the processor, the system model with respect to predetermined criteria to determine a preferred arrangement of apparatuses within the processing system,
    wherein at least one parameter relating to at least one of said apparatuses is indicative of at least one of an availability and a reliability of an apparatus expressed as a function of time
    wherein said at least one parameter indicative of at least one of the availability and the reliability is expressed as a function of a parameter related to preventive maintenance; and
    wherein the method further comprises:
    (a) assuming an initial value for a variable indicative of an interval of preventive maintenance of said at least one apparatus;
    (b) determining, by the processor, values of parameters indicative of at least one of the availability and the reliability of the apparatus based upon the initial value of the interval of preventive maintenance;
    (c) performing, by the processor, the step of analysing the system model with respect to the predetermined criteria, and determining a preferred value for the preventative maintenance interval from that step;
    (d) if the determined preferred value for the preventative maintenance interval is outside a predetermined range from the initial value of the preventative maintenance interval, repeating, by the processor, steps (b) to (d) using a new initial value for the preventive maintenance interval, until the determined preferred value is within a predetermined range of the initial value.

2. A method as claimed in claim 1, wherein said step of analysing the system model with respect to the predetermined criteria comprises minimising or maximising, by the processor, a value of a predetermined function.

3. A method as claimed in claim 1, wherein parameters indicative of both the availability and the reliability are expressed as functions of time.

4. A method as claimed in claim 1, wherein said parameter indicative of the availability of the apparatus is expressed as a function of a time taken to perform preventive maintenance.

5. A method as claimed in claim 1, wherein said step of analysing the system model with respect to predetermined criteria to determine a preferred arrangement of apparatuses within the processing system comprises determining, by the processor, a preferred value of preventive maintenance interval for at least some of the apparatuses in the preferred arrangement.

6. A method as claimed in claim 1, wherein said predetermined criteria includes minimisation of a capital investment in manufacturing the arrangement of apparatuses within the processing system and an operation cost of the apparatuses within the processing system throughout an anticipated life of the preferred arrangement of apparatuses.

7. A method as claimed in claim 1, further comprising analysing, by the processor, the predetermined criteria of a real apparatus to determine said parameters indicative of at least one of an availability and a reliability of the real apparatus.

8. A method as claimed in claim 1, wherein the parameter indicative of the reliability of an apparatus is expressed as a function of a time-dependent distribution.

9. A method as claimed in claim 1, wherein a reliability $R_{sys}(t)$ of an arrangement of apparatuses is expressed by a function $$R_{sys}(t) = \exp\left[-\left(\frac{t}{\theta}\right)^{\beta}\right], \theta > 0, \beta > 0, t \geq 0$$

where t is time, and $\theta$ and $\beta$ are Weibull distribution parameters.

10. A method as claimed in claim 1, wherein a parameter indicative of the reliability of an arrangement of apparatus comprising at least two apparatuses is expressed as a function of a time-dependent distribution.

11. A method as claimed in claim 1, wherein said system model is one of a superstructure optimization or a stochastic optimization model.

12. A method as claimed claim 1, further comprising the step of manufacturing the determined preferred arrangement of apparatuses.

13. A method as claimed in claim 12, further comprising the step of performing preventive maintenance upon the manufactured arrangement of apparatuses in accordance with the determined preferred value of preventive maintenance interval.

14. A non-transitory computer readable medium storing computable readable instructions configured to cause a computer to carry out the method according claim 1.

15. A design for a processing system comprising a plurality of apparatuses, the design being determined by performing the method as claimed in claim 1.

16. A processing system including the preferred arrangement of apparatuses as determined using the method of claim 1.

17. A processing system as claimed in claim 16, wherein the processing system is a chemical plant.

18. A method of optimising a processing system comprising a plurality of apparatuses, the method being implemented in a computer comprising a memory in communication with a processor, comprising:
defining a system model indicative of a predetermined range of apparatus options within a processing system, constraints indicative of feasible interconnections between each apparatus and another apparatus, and parameters indicative of performance criteria associated with each apparatus;
analysing, by the processor, the system model with respect to predetermined criteria to determine a preferred arrangement of apparatuses within the processing system,
wherein at least one parameter relating to at least one of said apparatuses is indicative of at least one of an availability and reliability of an apparatus expressed as a function of time; and
wherein the availability $A_{a,sys}$ of an arrangement of apparatuses is determined by $$A_{a,sys} = \frac{t_d}{t_d + MTTR_{sys} \cdot (-\ln(R_{sys}(t_d))) + MTPM_{sys} \cdot t_d / T_{PM,sys}}$$

where $MTTR_{sys}$ is a Mean Time To Repair the arrangement, $MTPM_{sys}$ is a Mean Time To Perform Preventive Maintenance of the arrangement, $R_{sys}$ is an arrangement reliability, $t_d$ is an arrangement life cycle and $T_{PM,sys}$ is a preventive maintenance interval of the arrangement.

19. A method as claimed in claim 18, wherein the parameter $T_{PM,sys}$ is a variable optimised within the analysing step.

20. A method of optimising a processing system comprising a plurality of apparatuses, the method being implemented in a computer comprising a memory in communication with a processor, comprising:
defining a system model indicative of a predetermined range of apparatus options within a processing system, constraints indicative of feasible interconnections between each apparatus and another apparatus, and parameters indicative of performance criteria associated with each apparatus;
analysing, by the processor, the system model with respect to predetermined criteria to determine a preferred arrangement of apparatuses within the processing system,
wherein at least one parameter relating to at least one of said apparatuses is indicative of at least one of an availability and reliability of an apparatus expressed as a function of time;
wherein the availability $A_{a,sys}$ of an arrangement of apparatuses is determined by $$A_{a,sys} = \frac{t_d}{t_d + MTTR_{sys} \cdot t_d / \theta\Gamma\left(1 + \frac{1}{\beta}\right) + MTPM_{sys} \cdot t_d / T_{PM,sys}}$$

where $MTTR_{sys}$ is a Mean Time To Repair the arrangement, $\theta$ and $\beta$ are Weibull parameters for the arrangement and $MTPM_{sys}$ is a Mean Time To Perform Preventive Maintenance of the arrangement, $t_d$ is an arrangement life cycle and $T_{PM,sys}$ is a preventive maintenance interval of the arrangement and $\Gamma$ is a gamma function.

21. A method of optimising a processing system comprising a plurality of apparatuses, the method being implemented in a computer comprising a memory in communication with a processor, comprising:
defining a system model indicative of a predetermined range of apparatus options within a processing system, constraints indicative of feasible interconnections between each apparatus and another apparatus, and parameters indicative of performance criteria associated with each apparatus;

analysing, by the processor, the system model with respect to predetermined criteria to determine a preferred arrangement of apparatuses within the processing system, wherein at least one parameter relating to at least one of said apparatuses is indicative of at least one of an availability and reliability of an apparatus expressed as a function of time; and wherein the availability of an arrangement of apparatuses comprising at least two apparatuses able to operate in i operational modes within the processing system is defined as the Process System Availability, PSA, $$PSA = \frac{\text{Real Throughput}}{\text{Ideal Throughput}} = \sum_i A_i x_i$$

where
$A_i$=Availability of the arrangement of apparatuses in operation mode i,
$x_i$=Ratio of actual capacity to maximum capacity of the arrangement in mode i.

22. A computer-implemented method of optimising a processing system comprising a plurality of apparatuses, the method being implemented in a computer comprising a memory in communication with a processor, comprising:

defining a system model indicative of a predetermined range of apparatus options within a processing system, constraints indicative of feasible interconnections between each apparatus and another apparatus, and parameters indicative of performance criteria associated with each apparatus;

analysing, by the processor, the system model with respect to predetermined criteria to determine a preferred arrangement of apparatuses within the processing system, wherein at least one parameter relating to at least one of said apparatuses is indicative of at least one of an availability and reliability of an apparatus expressed as a function of time;

wherein said at least one parameter indicative of at least one of the availability and the reliability is expressed as a function of a parameter related to preventive maintenance; and wherein at least one of availability and reliability functions are linearised functions.

* * * * *